United States Patent [19]
Ikedo et al.

[11] Patent Number: 5,195,078
[45] Date of Patent: Mar. 16, 1993

[54] RECORDING MEDIUM CONVEYING DEVICE INCLUDING A PAIR OF CIRCULAR COAXIAL GEARS

[75] Inventors: Yuji Ikedo; Katsumi Sawada; Shogo Sato, all of Saitama, Japan

[73] Assignee: Pioneer Electronic Corporation, Tokyo, Japan

[21] Appl. No.: 808,791

[22] Filed: Dec. 11, 1991

[30] Foreign Application Priority Data

May 24, 1991 [JP] Japan .................................. 3-120479

[51] Int. Cl.[5] ...................... G11B 25/04; G11B 33/04; G11B 17/04
[52] U.S. Cl. .................................. 369/75.2; 369/75.1; 360/99.07; 74/422
[58] Field of Search ....................... 369/258, 264, 75.1, 369/75.2; 360/99.02, 99.03, 99.06, 99.07; 235/479; 74/422

[56] References Cited
U.S. PATENT DOCUMENTS

| | | | |
|---|---|---|---|
| 4,653,039 | 3/1987 | Ueno et al. | 369/75.2 |
| 5,119,357 | 6/1992 | Tsuruta et al. | 369/75.2 |
| 5,123,005 | 6/1992 | Kurosu | 369/75.2 |

Primary Examiner—Stuart S. Levy
Assistant Examiner—Paul Ditmyer
Attorney, Agent, or Firm—Sughrue Mion Zinn Macpeak & Seas

[57] ABSTRACT

A recording medium conveying device for conveying a recording medium to a playing position through an inserting opening formed in a player housing, which includes: a base body provided in the player housing; a movable bearing member for bearing the recording medium, the movable bearing member being provided on the base body in such a manner that the movable bearing member is movable between a protruding position outside of the player housing and an accommodating position inside the player housing; and a driving mechanism for moving the bearing member. The driving mechanism includes: a rack (5) provided on one of the base body and the bearing member, in such a manner that the rack (5) is extended in a direction of movement of the bearing member; a gear unit (49) provided on the other of the base body and the bearing member, and engaged with the rack (5); and a torque applying mechanisn for applying torque to the gear unit (49). The gear unit includes a pair of circular gear different in diameter from each other which are stacked coaxially as one unit, and an arcuate relay gear (49e) having a pitch circle which internally touches the pitch circle of one of the pair of circular gears which is larger in diameter and externally touches the other, and connecting the pair of circular gears to each other. The rack (5) has straight portions (5g) engageable with the pair of circular gears (e.g. 49a), and a curved portion (5r) engageable with the arcuate relay gear (49e).

4 Claims, 21 Drawing Sheets

RECORDING MEDIUM CONVEYING DEVICE INCLUDING A PAIR OF CIRCULAR COAXIAL GEARS

BACKGROUND OF THE INVENTION

The present invention relates to a recording medium conveying device which conveys a recording medium, such as an optical data recording disk (hereinafter referred to as "a disk", when applicable), to a playing position through an inserting opening formed in a player housing.

An example of a conventional recording medium conveying device of this type is as shown in FIGS. 35 through 37. As shown in FIGS. 35 and 36, a movable disk bearing member 253 adapted to bear a disk 252 is inserted into or protruded out of a player housing through an inserting opening 251a formed in the front panel 251 of the player housing. The disk bearing member 253 comprises: a container supporting member 255 in the form of a flat box which is mounted on a chassis (not shown), which chassis is a base body or support fixedly provided in the player housing, in such a manner that container supporting member 255 is movable forwardly and backwardly (or in the direction of the arrow Y and in the opposite direction); and a flat-plate-shaped container 256 for bearing the disk 252. The container 256 is coupled to the container supporting member 255 in such a manner that the container 256 is movable upwardly and downwardly (in the direction of the arrow Z and in the opposite direction). In addition, drive means (not shown) is provided which operates to move the container supporting member 255 with respect to the aforementioned chassis, and to move the container 256 with respect to the container supporting member 255.

With the disk bearing member 253 comprising the container supporting member 255 and the container 256 protruded from the player housing, a disk 252 is placed on the container. Under this condition, the container supporting member 255 is pushed backwardly to position the disk bearing member 253 inside the player housing. Thereafter, the container 256 is moved downwardly toward the container supporting member 255, thereby to set the disk 252 at the disk playing position. The aforementioned drive means comprises: a drive source, namely, an electric motor (not shown); and power transmitting means (not shown) for converting the torque of the motor into the power of linear motion, and transmitting it to the container supporting member 255 and the container 256.

With such a recording medium conveying device, during the operation of pulling out the disk bearing member and/or during the operation of pushing in the disk bearing member, the speed of movement of the disk bearing member 253 is reduced near the end of the operation to lessen the shock and noise so that the operation appears moderate. This will now be specifically described. FIG. 36 shows one example of a speed changing means for changing the speed of movement of the disk bearing member 253. The speed changing means, as shown in FIG. 36, comprises front and rear detecting switches 258 and 259, respectively, which are arranged in a line (in the direction of the arrow Y) in the player housing so as to engage with the rear end of the container supporting member 255 of the disk bearing member 253. That is, when the disk bearing member 253 is engaged with the front detecting switch 258 while being pushed into the housing, the voltage applied to the motor is decreased, and when it is engaged with the rear detecting switch 259, the application of current to the motor is suspended. However, the above-described speed changing means is disadvantageous in the following points: The speed of movement of the disk bearing member 253 is changed stepwise; that is, the operation of pushing in or pulling out the disk bearing member is not smooth. Since it is necessary to provide the two detecting switches 258 and 259, the manufacturing cost is likewise increased.

FIG. 37 shows another example of the speed changing means which is well known in the art. The speed changing means includes only one detecting switch 259 for stopping the disk bearing member 253. In order to reduce the speed of movement of the disk bearing member, a rotary oil damper 260 is provided, and a rack 255a is formed on the rear end portion of the container supporting member 255 of the disk bearing member 253 so as to engage with the gear of the oil damper 260. With such a speed changing means, during the operation of pushing in the disk bearing member 253 the rack 255a is engaged with the gear of the oil damper 26, thus reducing the speed of movement of the disk bearing member 253. Thereafter, the disk bearing member 253 engages with the detecting switch 259, to suspend the application of current to the motor. However, the above speed changing means is also disadvantageous in that the speed of movement of the disk bearing member is not continuously changed, and since it is necessary to provide the oil damper 260 and the rack 255a, the manufacturing cost is likewise increased.

Another example of the speed changing means may be considered which is designed as follows: In the speed changing means, unlike the above-described ones, the detecting switch 258 as shown in FIG. 36 and the oil damper 260 (and rack 255a) as shown in FIG. 37 are not employed, and instead the detecting switch 259 is positioned slightly before (in the direction of the arrow Y) that which is shown in FIG. 36 or 37. With such a speed changing means, upon engagement of the disk bearing member 253 with the detecting switch, the application of current to the motor is suspended, and then the disk bearing member 253 is allowed to run freely until it stops naturally. However, the speed changing means is still disadvantageous in that the speed of movement of the disk bearing member is not satisfactorily reduced, and it is rather difficult to accurately stop the disk bearing member in position.

SUMMARY OF THE INVENTION

In view of the foregoing, an object of the present invention is to provide a recording medium conveying device with which the speed of movement of the disk bearing member is reduced continuously and smoothly, and the disk bearing member can be stopped in place with high accuracy, and which is low in manufacturing cost.

The foregoing object of the invention has been achieved by the provision of a recording medium conveying device for conveying a recording medium to a playing position through an inserting opening formed in a player housing, which, according to the invention, comprises: a base body provided in the player housing; a movable bearing member for bearing the recording medium, the movable bearing member being provided on the base body in such a manner that the movable bearing member is movable between a protruding position outside of the player housing and an accommodating position inside the player housing; and driving means for moving the bearing member. The driving means comprises: a rack provided on one of the base body and the bearing member, in such a manner that the rack is extended in a direction of movement of the bearing member; a gear unit provided on the other of the base body and the bearing member, and engaged with the rack; and torque applying means for applying torque to the gear unit. The gear unit includes a pair of circular gears different in diameter from each other which are stacked coaxially as one unit, and an arcuate relay gear having a pitch circle which internally touches the pitch circle of one of the pair of circular gears which is larger in diameter and externally touches the other, and connecting the pair of circular gears to each other. The rack has straight portions engageable with the pair of circular gears, and a curved portion engageable with the arcuate relay gear.

In the recording medium conveying device thus designed, the rack engages with the large-diameter circular gear, the arcuate relay gear and the small-diameter circular gear of the gear unit successively, so that the speed of movement of the movable bearing member is reduced continuously and smoothly.

DETAILED DESCRIPTION OF THE PREFERRED EMBODIMENTS

An automatic loading disk player will be described with reference to the accompanying drawings which is equipped with a recording medium conveying device which constitutes one embodiment of this invention.

Figure 1:
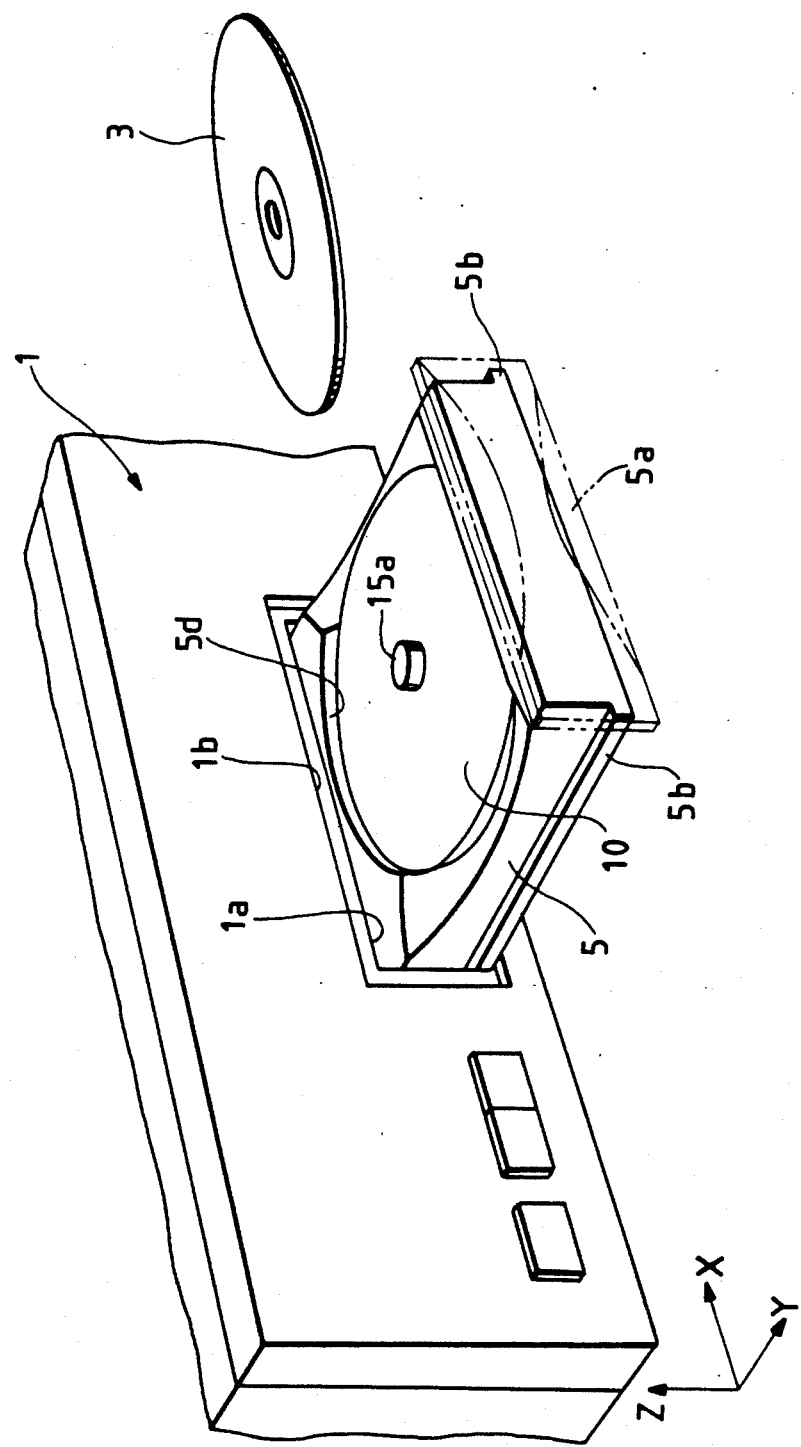
FIG. 1 is a perspective view showing the front panel of an automatic loading disk player which constitutes one embodiment of this invention.

As shown in FIG. 1, the front panel of a player housing 1 has an inserting opening 1a in the form of a horizontally elongated rectangle through which a recording medium, namely, a disk 3 is inserted into the player housing 1 so as to be positioned at a disk playing position. In FIG. 1, the arrow X represents the left direction (as viewed from the player housing), the arrow Y the forward direction, and the arrow Z the upward direction.

Figure 2:
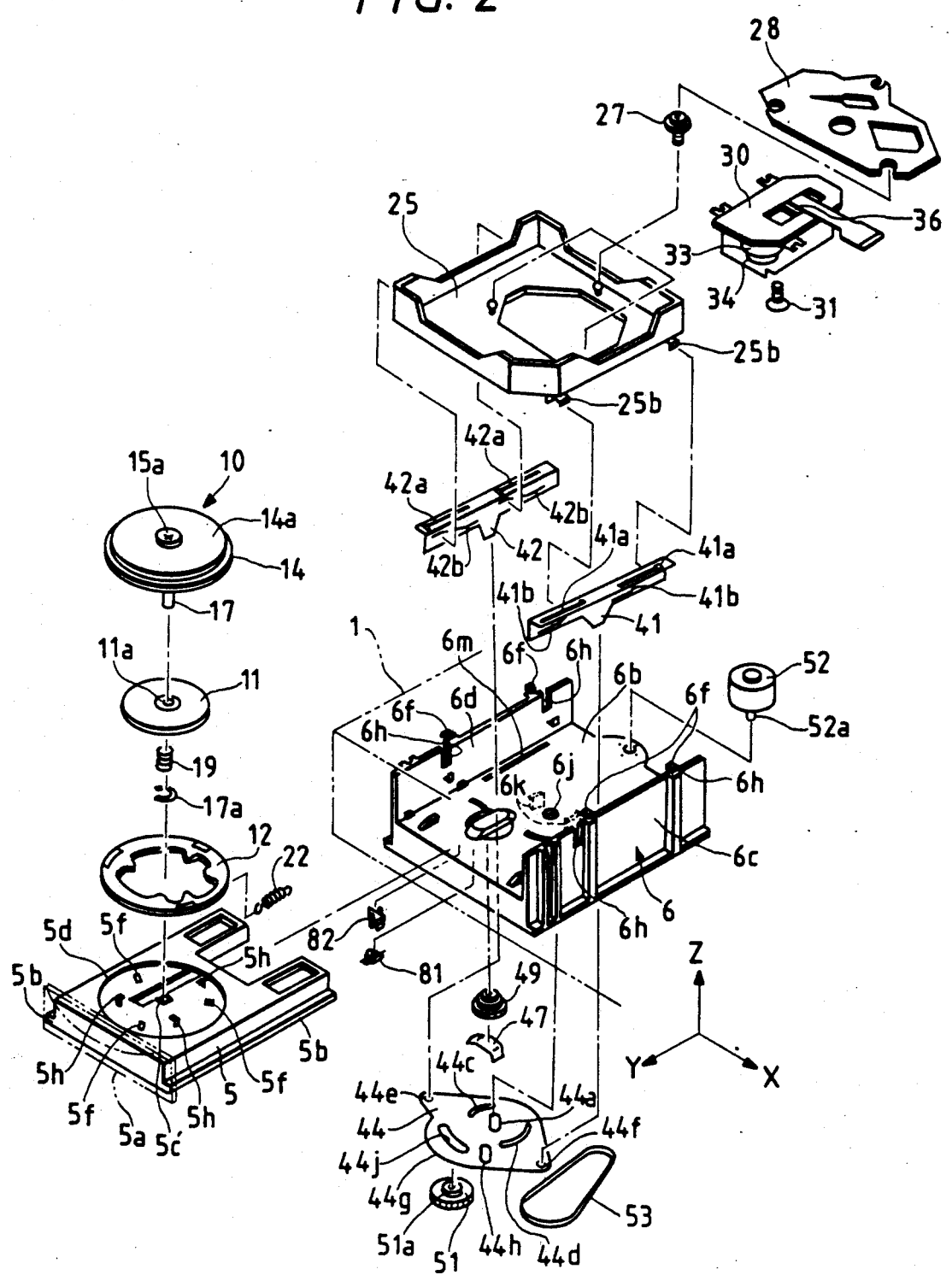
FIG. 2 is an exploded view showing the internal structure of the automatic loading disk player.
Figure 3:
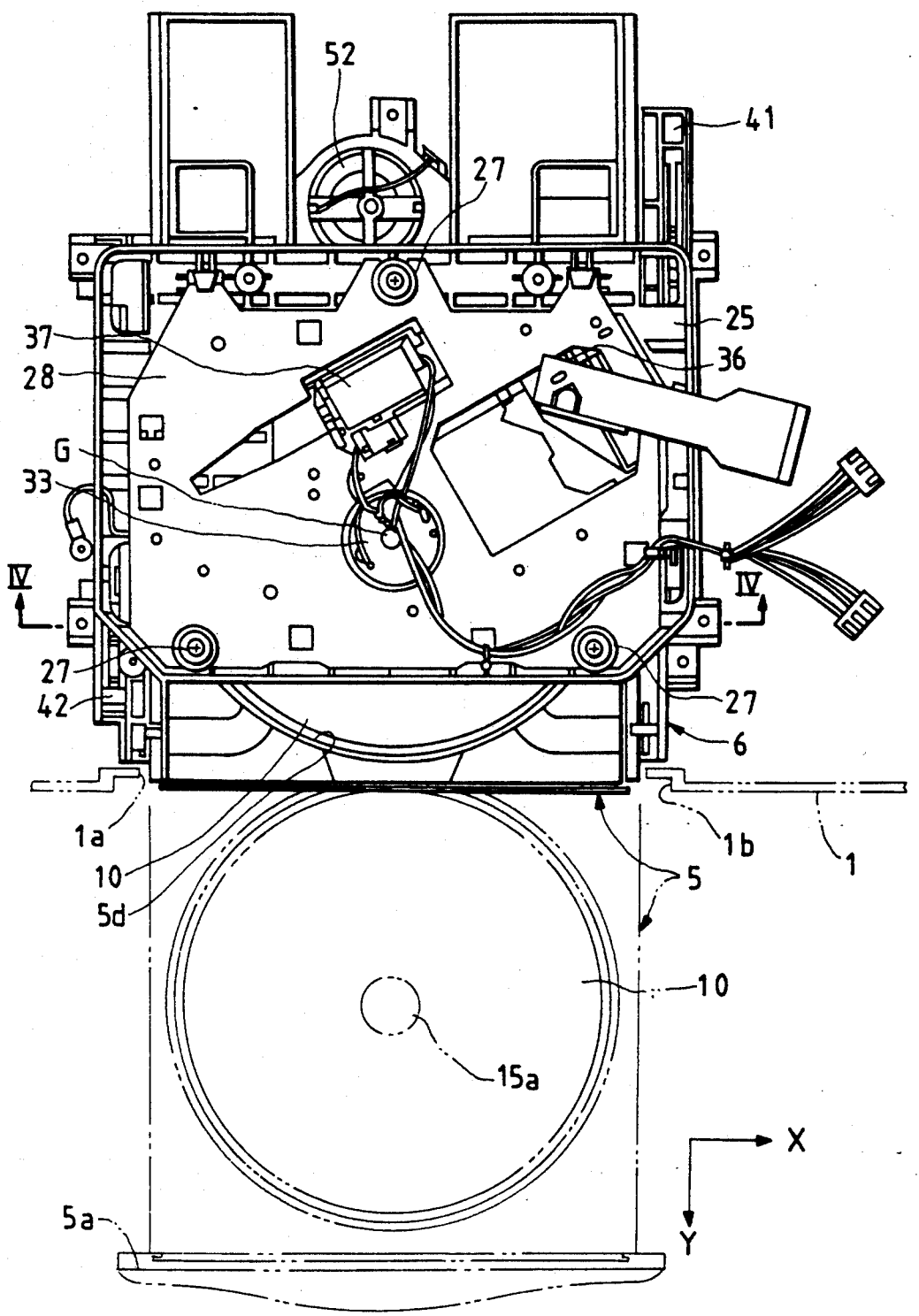
FIG. 3 is a plan view showing the internal structure of the automatic loading disk player.
Figure 4:
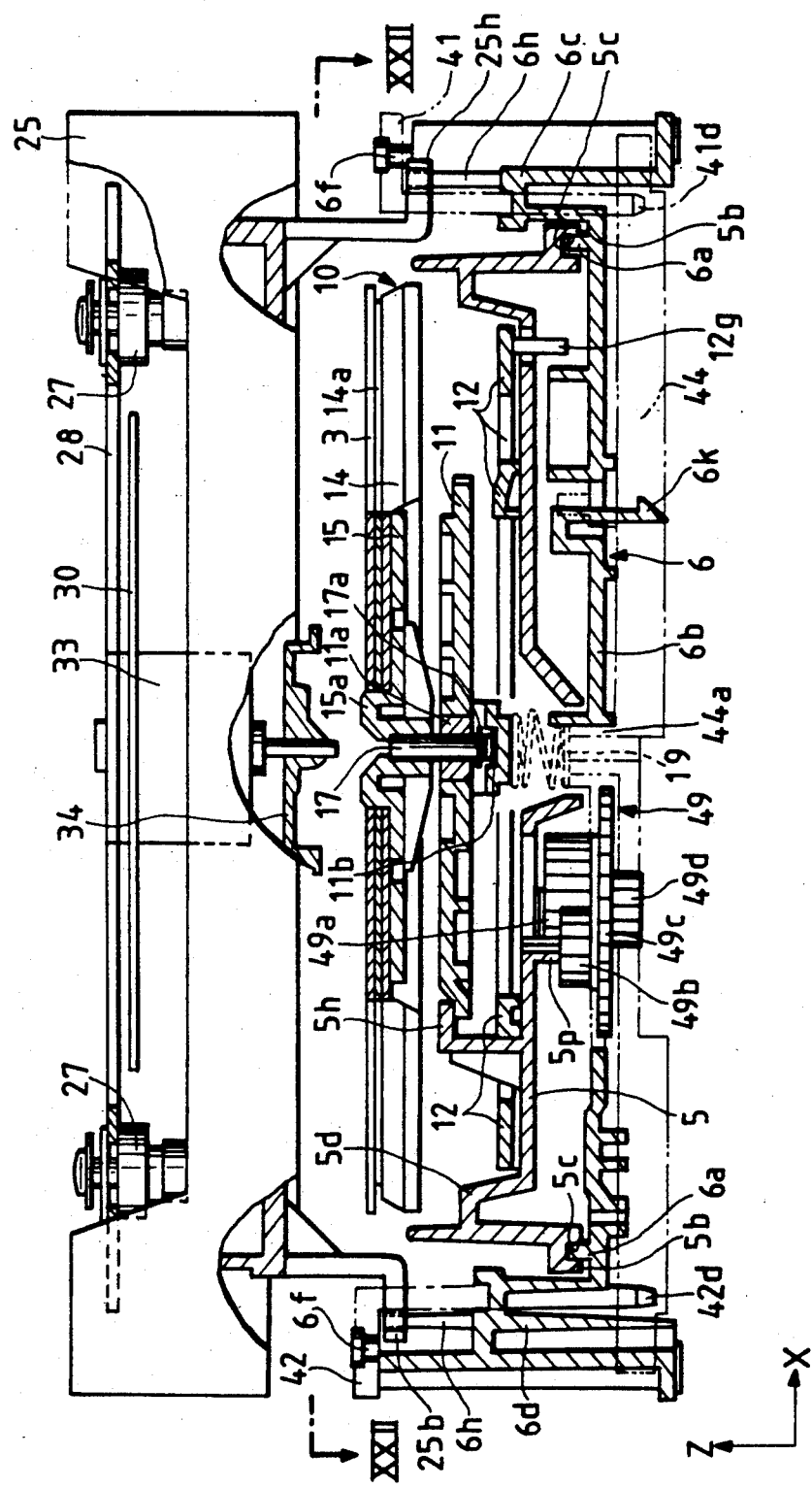
FIG. 4 is a fragmentary view taken in the direction of the arrows substantially along line IV—IV in FIG. 3.
Figure 5:
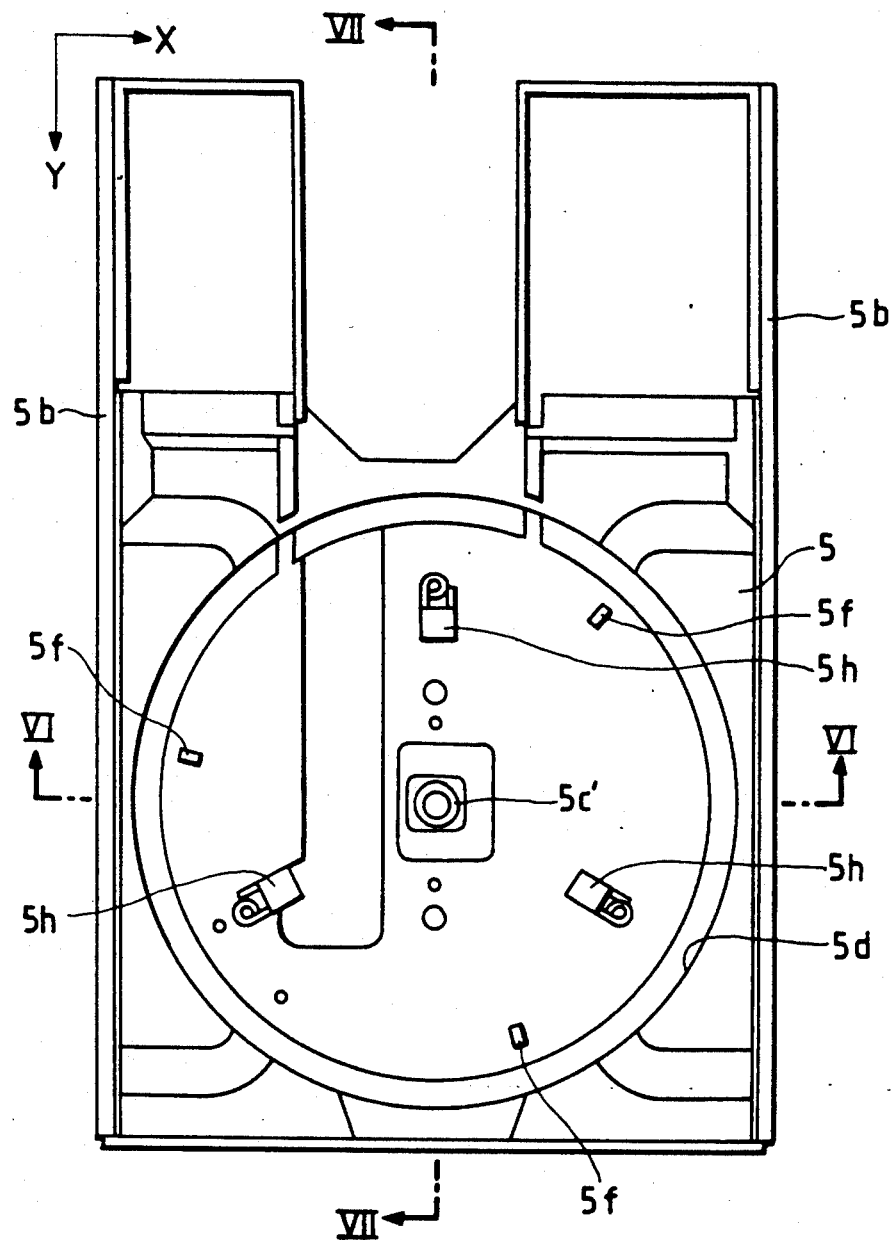
FIG. 5 is a plan view of a tray in the internal structure shown in FIG. 2.
Figure 6:
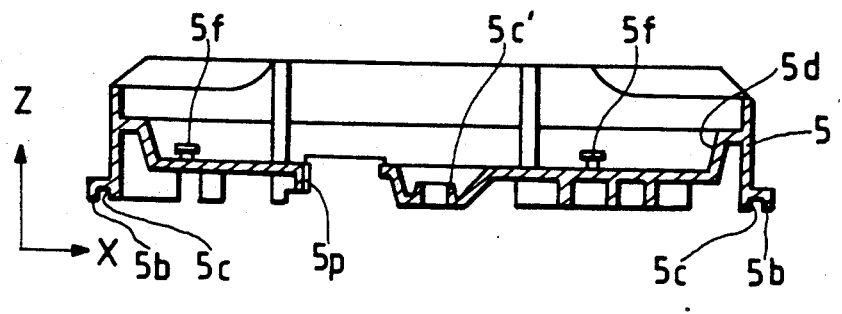
FIG. 6 is a sectional view taken along line VI—VI in FIG. 5.
Figure 7:
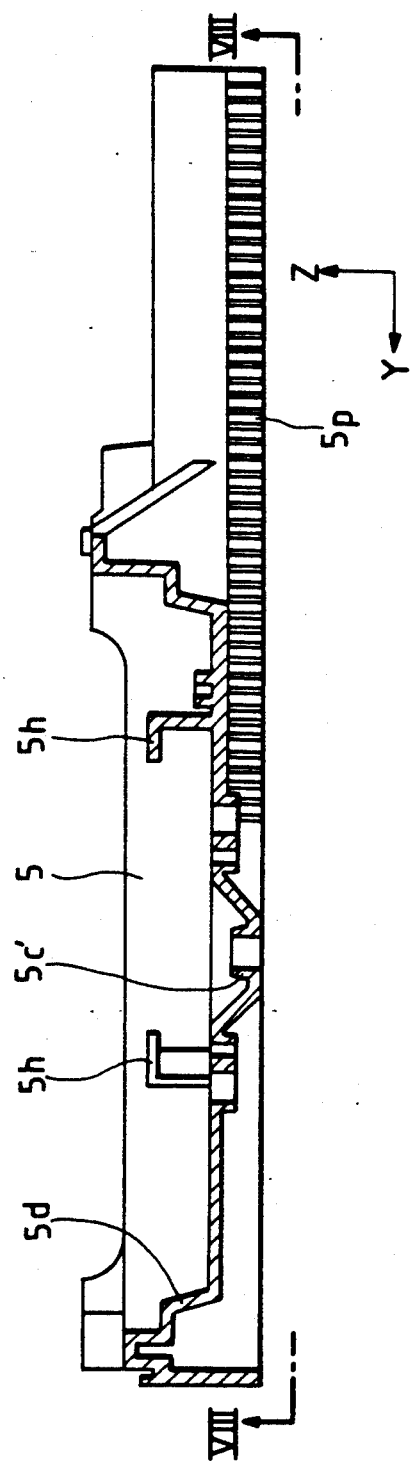
FIG. 7 is a sectional view taken along line VII—VII in FIG. 5.
Figure 8:
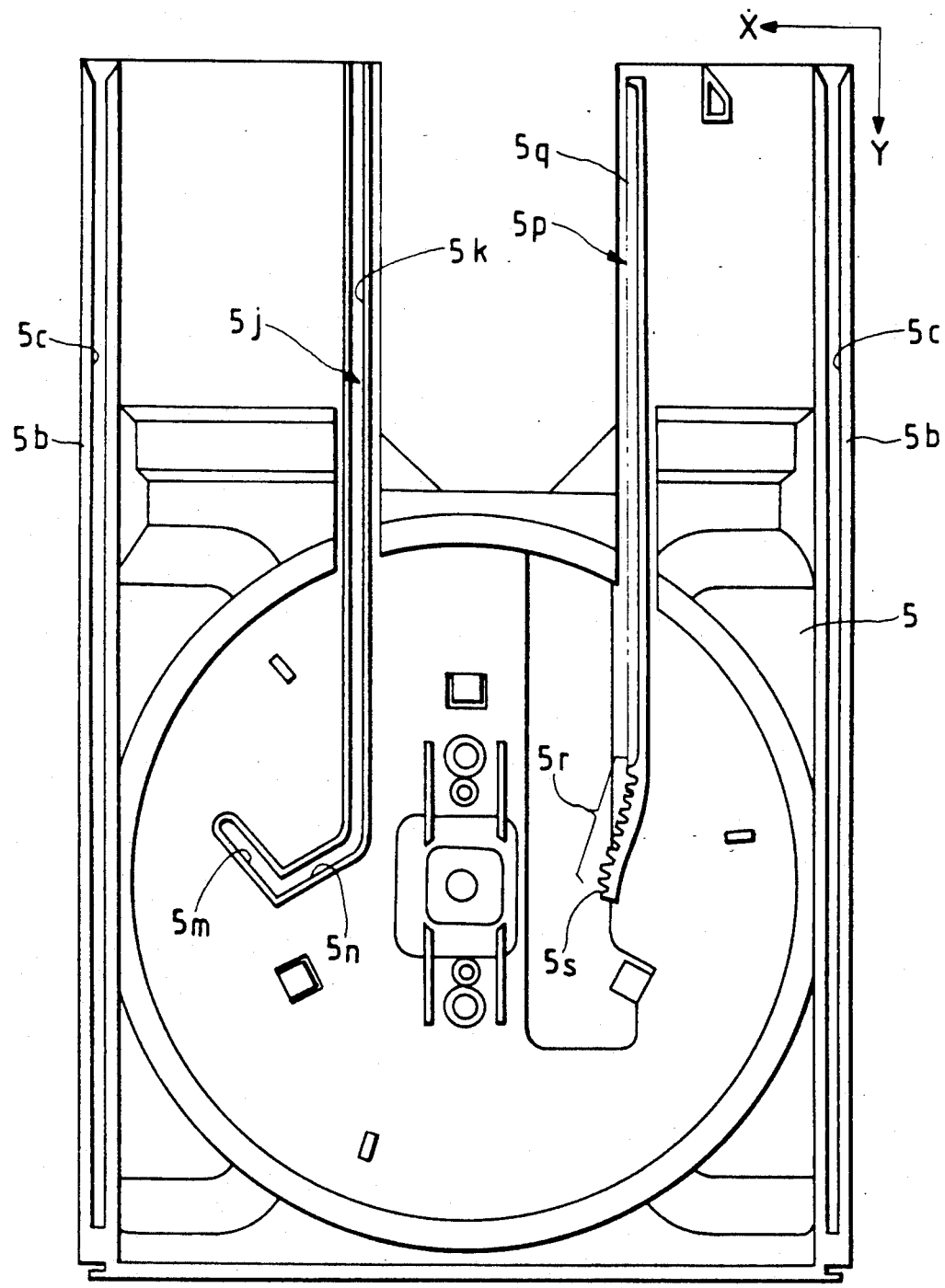
FIG. 8 is a view taken in the direction of the arrows substantially along line VIII—VIII in FIG. 7.

As also shown in FIGS. 2 and 3, a movable disk bearing member, namely, a tray 5 is provided in such a manner that it is movable forwardly and backwardly (in the direction of the arrow Y and in the opposite direction); that is, the tray 5 is reciprocated between a protruding position and an accommodating position by being pushed into and pulled out of the player housing 1 through the inserting opening 1a. The tray 5 has a decorating board 5a at the front end to completely close the inserting opening 1a. As shown in FIGS. 1 and 3, the front panel has a recess 1b around the opening 1a. The decorating board 5a is fitted in the recess 1b. The tray 5 is slidably mounted on a chassis 6 which is a base body in the player housing 1. The tray 5 is substantially in the form of a flat box and has two elongated extensions 5b and 5b on the right and left sides which are extended in the direction of the arrow Y. As shown in FIG. 4, guide grooves 5c are formed in the lower surfaces of the extensions 5b, respectively, and slidably engaged with guide protrusions 6a, respectively, which are formed on the chassis 6. The tray 5 is shown in FIGS. 5 through 8 in more detail. The extensions 5b and the guide grooves 5c are shown in FIGS. 5, 6 and 8 in more detail.

As shown in FIGS. 1 through 7, a circular recess 5d is formed in the upper surface of the front half of the tray 5. In the circular recess 5d, a turntable 10 and a table bearing 11 which are each in the form of a disk, and a locking ring, namely, a lock plate 12 are coaxially stacked (in the direction of the arrow Z) one on another. The turntable 10 is shown in FIGS. 9 through 12 in detail, the table bearing 11 in FIGS. 13 through 15, and the lock plate 12 in FIGS. 16 through 20.

Figure 9:
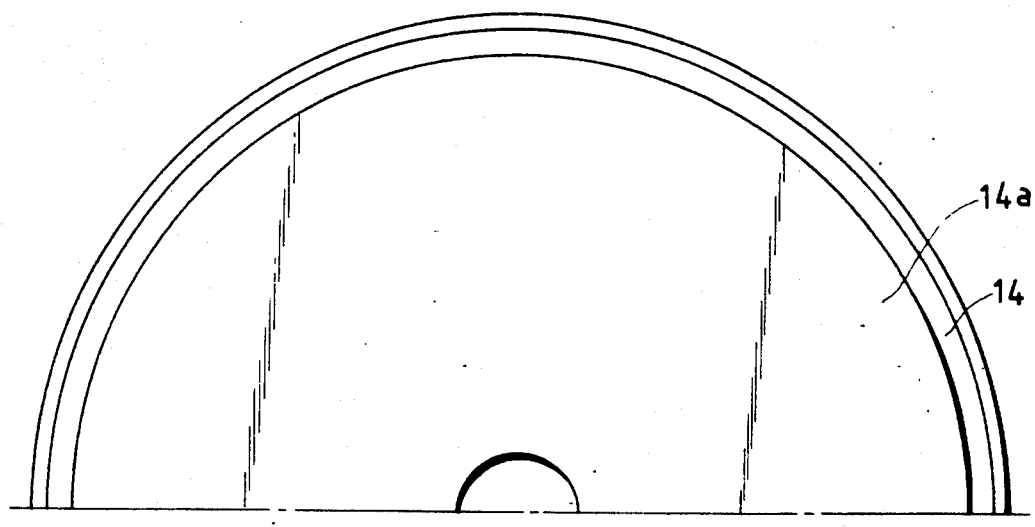
FIG. 9 is a plan view of a disk bearing plate forming a part of a turntable in the internal structure shown in FIG. 2.
Figure 10:
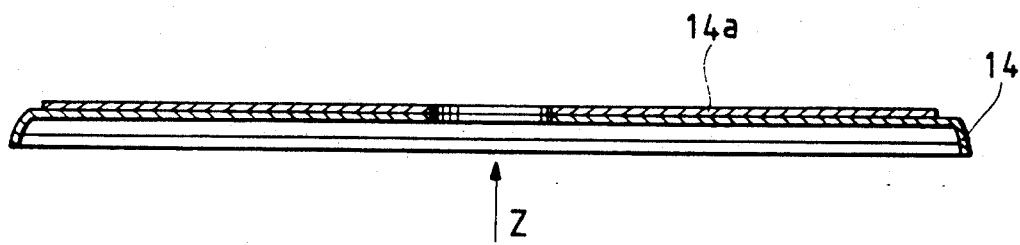
FIG. 10 is a vertical sectional view of the disk bearing plate shown in FIG. 9.
Figure 11:
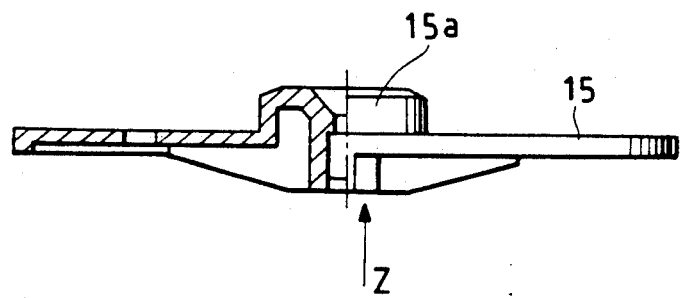
FIG. 11 is a front view, partly as a sectional view, showing a boss forming a part of the turntable in the internal structure shown in FIG. 2.
Figure 12:
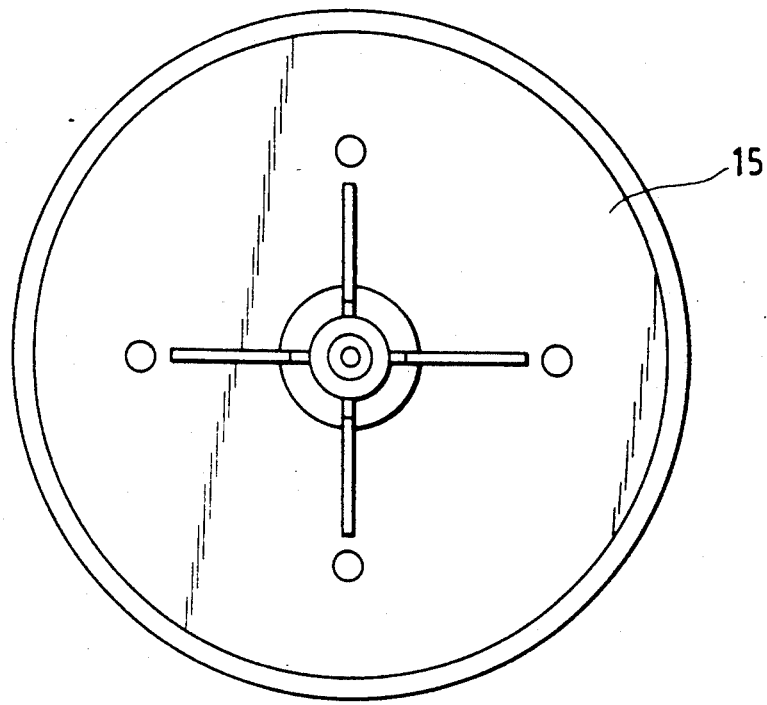
FIG. 12 is a bottom view of the boss shown in FIG. 11.

As is apparent from FIG. 4, the turntable 10 is formed by coaxially combining a disk bearing plate 14 adapted to bear a disk 3, and a boss 15 with a positioning protrusion 15a which is inserted into the central hole of a disk 3. The turntable 10 holds a disk 3 with the aid of a depressing or pressure member (described later), to turn or rotate it. FIGS. 9 and 10 are a plan view and a vertical sectional view of the disk bearing plate 14, respectively. FIGS. 11 and 12 are a front view (partly as a sectional view) and a bottom view of the boss 15, respectively. As is seen from FIGS. 4, 9 and 10, a thin-film-shaped table cloth 14a of rubber or the like is affixed to the disk bearing surface of the disk bearing plate 14.

Figure 13:
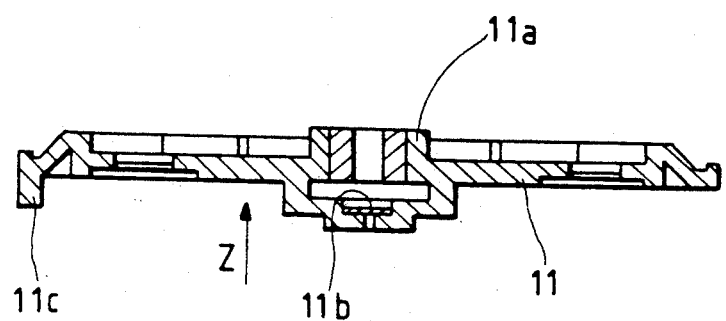
FIG. 13 is a vertical sectional view of a table bearing in the internal structure shown in FIG. 2.

As shown in FIGS. 2 and 4, a spindle 17 is fixedly fitted in the boss 15 of the turntable 10, and it is rotatably supported on the table bearing 11. More specifically, as shown in FIGS. 2, 4 and 13, a radial bearing 11a and a thrust bearing 11b are fitted in the table bearing 11, to support the spindle 17. An E ring 17a is mounted on the lower end portion of the spindle 17, so as to prevent the spindle 17 from coming off.

As shown in FIGS. 2 and 4, the table bearing 11, which rotatably supports the turntable 10, is supported on the tray 5 through second vibration proofing means, namely, a coil spring 19. The coil spring 19 is positioned with its lower end portion fitted on a protrusion 5c' formed on the tray 5. That is, the turntable 10 is mounted on the tray 5 only by the single coil spring 19 which is an elastic member. Therefore, the turntable will flexibly follow the turning or rotating of the depressing member (described later). This will prevent the deflection of the rotation axis of the turntable which otherwise may be caused during rotation of the disk.

Figure 16:
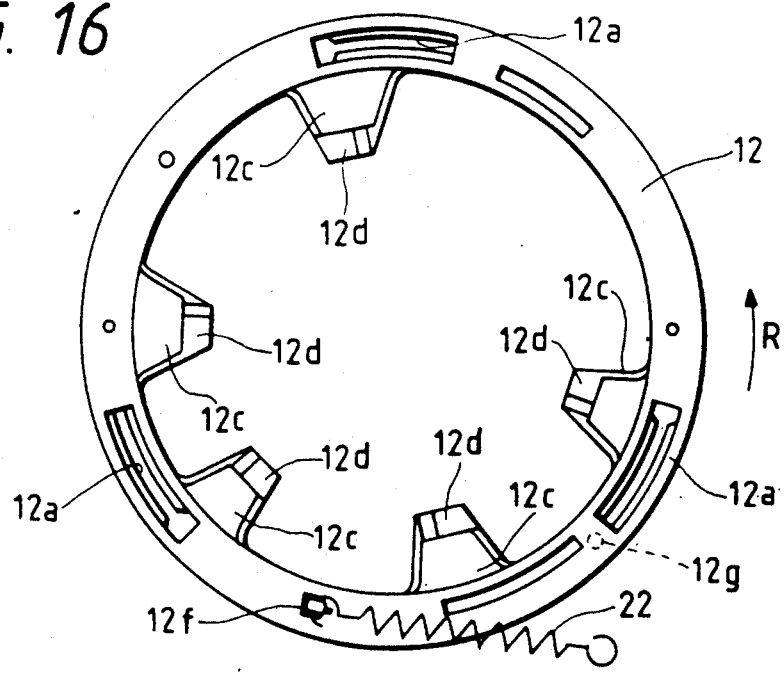
FIG. 16 is a plan view of a lock plate in the internal structure shown in FIG. 2.
Figure 18:
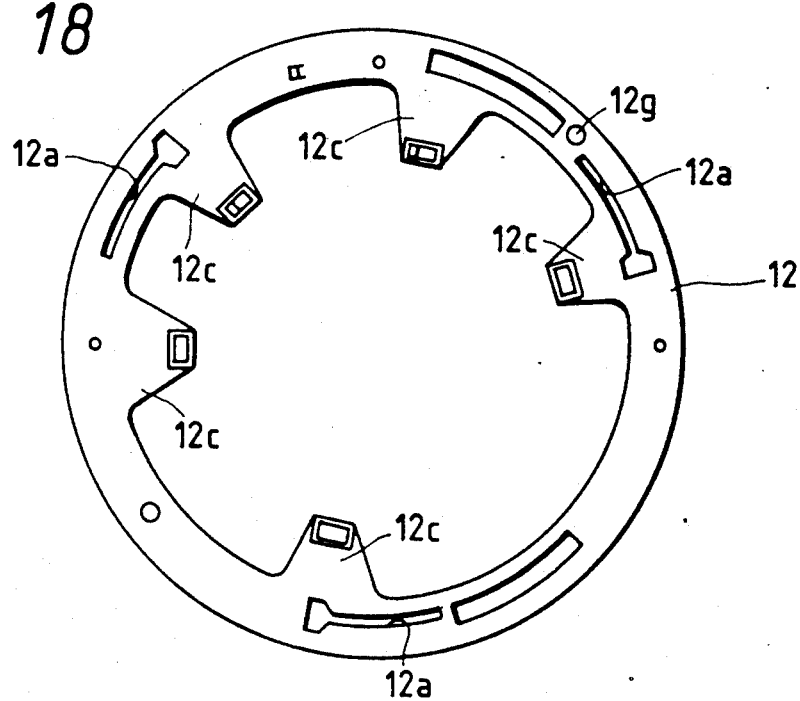
FIG. 18 is a bottom view of the lock plate shown in FIGS. 16 and 17.
Figure 19:
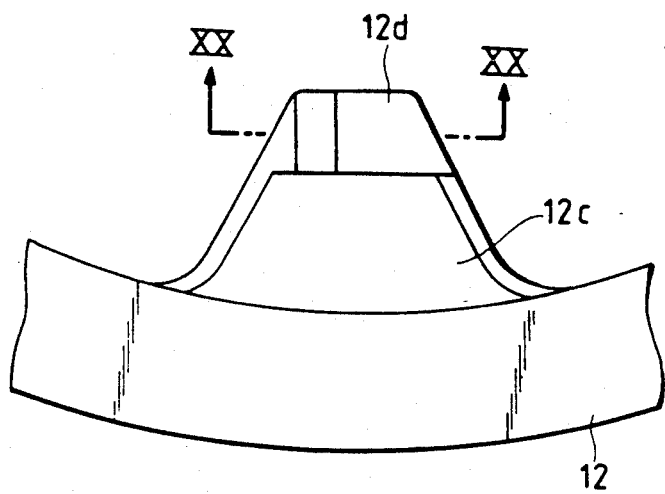
FIG. 19 is a plan view showing an engaging protrusion of the lock plate shown in FIGS. 16 through 18.
Figure 20:
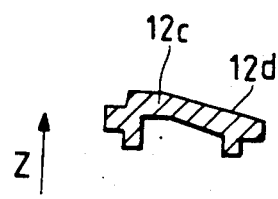
FIG. 20 is a sectional view taken along line XX—XX in FIG. 19.

The lock plate (or lock ring) 12 is provided below the turntable 10 and the table bearing 11 to lock the table bearing 11 and the turntable 10, which is rotatably supported by the table bering 11, to the tray 5 or to unlock them from the tray 5. The lock plate 12 is rotatably provided on the bottom of the circular recess 5d formed in the tray 5. As shown in FIGS. 16 and 18, the lock plate 12 is substantially in the form of a ring, and has three arcuate elongated holes 12a which are formed at equiangular intervals in its annular body. As shown in FIGS. 2, 5 and 6, three T-shaped protrusions 5f are extended from the bottom of the aforementioned recess 5d. The T-shaped protrusions 5f are engaged with the elongated holes 12a, respectively; that is, the lock plate 12 is slidably engaged with the T-shaped protrusions 5f through the elongated holes 12a. As is apparent from FIGS. 16 and 18, the lock plate 12 has for instance five locking pieces 12c which are extended from the inner periphery of the annular body towards the center of rotation of the lock plate 12. FIG. 19 is an enlarged diagram showing one of the locking pieces 12c. FIG. 20 is a sectional view taken along line XX—XX in FIG. 19. As shown in FIGS. 20 and 16, the upper surface of the end portion of each locking piece 12c includes a tapered surface 12d.

Figure 14:
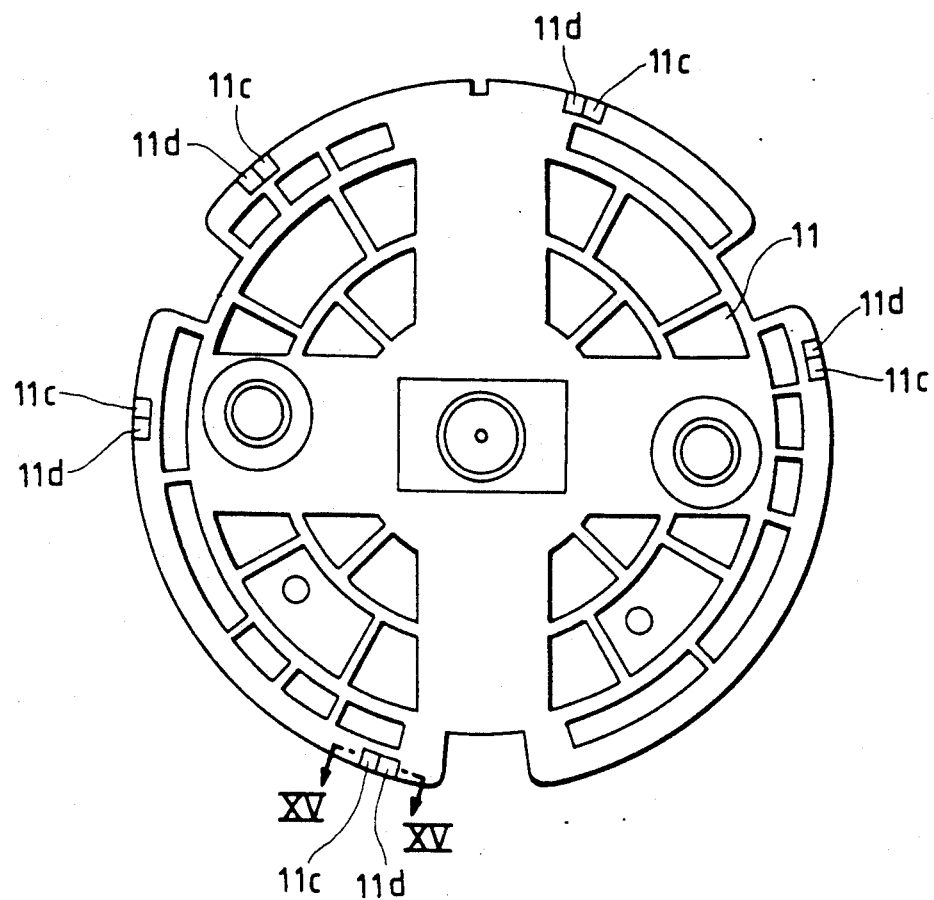
FIG. 14 is a bottom view of the table bearing shown in FIG. 13.
Figure 15:
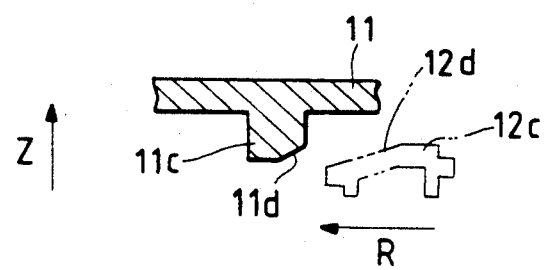
FIG. 15 is a sectional view taken along line XV—XV in FIG. 14.

As shown in FIGS. 13 and 14, in correspondence to the above-described five locking pieces 12c of the lock plate 12, locked or engaging protrusions 11c are extended from the lower surface of the outer peripheral portion of the table bearing 11 which is to be locked by the lock plate 12. FIG. 15 is a sectional view taken along line XV—XV in FIG. 14. As shown in FIGS. 14 and 15, each protrusion 11c has a tapered surface at the end portion. As is apparent from FIGS. 15 and 16, by turning or rotating the lock plate 12 counterclockwise (in the direction of the arrow R) as viewed from above, the tapered surfaces 12d of the locking protrusions 12c are engaged with the tapered surfaces 11d of the locked protrusions 11 of the table bearing 11, respectively; whereas by turning or rotating it clockwise (in the direction opposite to the direction of the arrow R), the tapered surfaces 12d are disengaged from the tapered surfaces 11d. As is seen from FIG. 15, both the tapered surfaces 12d of the locking protrusions 12c and the tapered surfaces 11d of the locked protrusion 11c are sloped downwardly (in the direction opposite to the direction of the arrow Z) as viewed in the direction of the arrow R. As was described above, the table bearing 11 is supported through the coil spring 19 on the tray 5. Therefore, when the tapered surfaces 12d of the locking protrusion 12c engage with the tapered surfaces 11d of the locked protrusions 11c to push them, the table bearing 11 is slightly moved upwardly (in the direction of the arrow Z) by a wedge action. As shown in FIGS. 2, 4, 5 and 7, three L-shaped receiving pieces 5h are formed at equiangular intervals on the tray 5. The L-shaped receiving pieces 5h receive the table bearing 11 with their upper portion abutted against the upper surface of the table bearing. That is, the table bearing 11 is locked from above and below by the receiving pieces 5h and the locking pieces 12c of the locking plate 12. In the case where the locking pieces 12c are not in engagement with the locked pieces 11c, the L-shaped receiving pieces 5h are spaced from the table bearing; that is, the receiving pieces 5h are not in contact with the table bearing.

Figure 17:
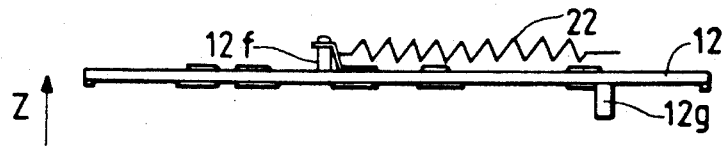
FIG. 17 is a front view of the lock plate shown in FIG. 16.

As shown in FIGS. 16 and 17, one end of a coil spring 22 is connected to a protrusion 12f which is formed on the upper surface of the annular lock plate body of the lock plate 12. The coil spring 22 is also shown in FIG. 2. The other end of the coil spring 22 is connected to the tray 5, to urge the lock plate 12 counterclockwise (in the direction of the arrow R in FIG. 16); that is, the tapered surfaces 12d of the locking protrusions 12c are kept urged by the coil spring 22 to be engaged with the tapered surface 11d of the locked protrusions 11c of the table bearing 11.

As shown in FIGS. 4, 16, 17 and 18, a pin 12g is embedded in the lower surface of the annular lock plate body of the lock plate 12 in such a manner that it is extended from a predetermined position on the lower surface. The pin 12g functions as follows: That is, when the tray 5 is pushed into the player housing 1, the pin 12g is engaged with a protrusion (not shown) extended from a predetermined position on the chassis 6, and the operation of pushing in the tray 5 causes the protrusion to react on the pin 12g, so that the pin 12g turns the lock plate 12 clockwise (in the direction opposite to the direction of the arrow R) in FIG. 16 against the elastic force of the coil spring 19. As a result, the locked pieces 11c of the table bearing 11 are disengaged from the locking pieces 12c of the lock plate 12; that is, the table bearing 11 and the turntable 10 are unlocked from the tray 5.

The coil spring 19, the pin 12g of the lock plate 12, and the protrusion (not shown) formed on the chassis 6 so as to engage with pin 12g form locking annular body rotating means which turns the locking annular body, namely, the lock plate 12 in the forward direction and in the reverse direction as the tray 5 is pulled out of and pushed into the player housing 1. The locking annular body rotating means, the lock plate 12, the locked pieces 11d formed on the table bearing 11 so as to engage with the locking pieces 12d of the lock plate 12, and the receiving pieces 5h of the tray 5 form locking means for locking the turntable 10 to and unlocking it from the tray 5 as the tray 5 is pushed into and pulled out of the player housing 1.

As was described above, when the turntable is outside the player housing 1, it is fixedly locked to the tray 5 by the locking means. Hence, the turntable is not vibrated, thus providing a sufficiently high disk holding effect.

As shown in FIGS. 2, 3 and 4, a movable base 25 substantially in the form of a rectangular plate is provided above the chassis 6. A mechanical chassis 28 in the form of a flat plate is mounted on the movable base 25 through three first vibration proofing means, namely, floatable rubber members 27. As shown in FIGS. 2 and 4, a bearing board 30 is secured to the lower surface of the mechanical chassis 28 with a plurality of screws 31. A motor 33 is mounted on the bearing board 30 in such a manner that its output shaft is extended downwardly. A disk-shaped depressing member 34 is fixedly mounted on the output shaft of the motor 33, to abut against a disk 3 to be played and depress the disk 3 against the turntable 10. As shown in FIGS. 2 and 3, an optical pickup 36 is provided on the bearing board 30 in such a manner that it is movable along the recording surface of the disk 3. In addition, pickup driving means including an electric motor 37 is mounted on the bearing board 30, to move the optical pickup 36.

The mechanical chassis 28, the bearing board 30, the motor 33, the depressing member 34, the optical pickup 36, and the pickup driving means including the motor 37 form playing means for playing the disk 3.

Figure 21:
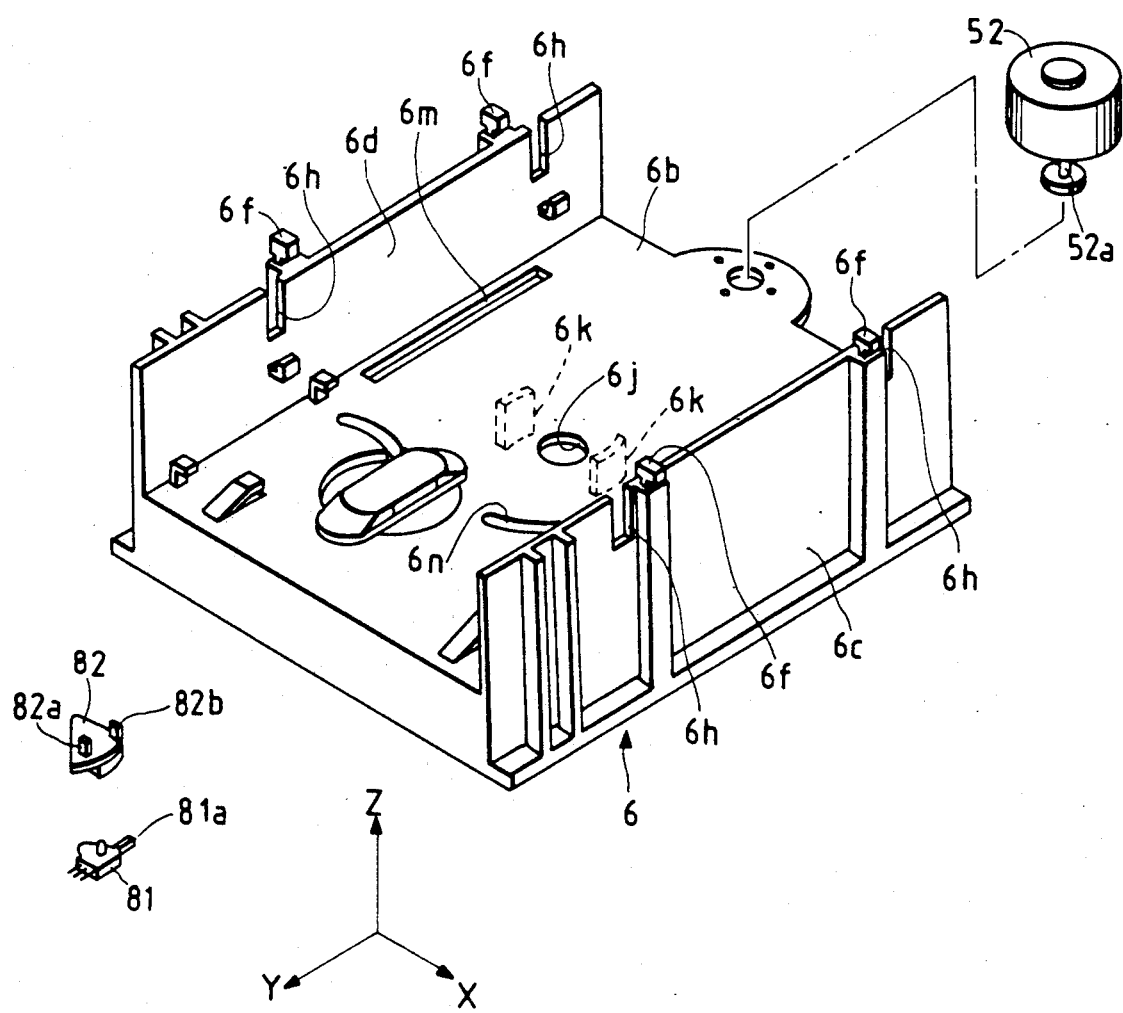
FIG. 21 is an exploded view showing a chassis, motor and detecting switch in the internal structure shown in FIG. 2.
Figure 24:
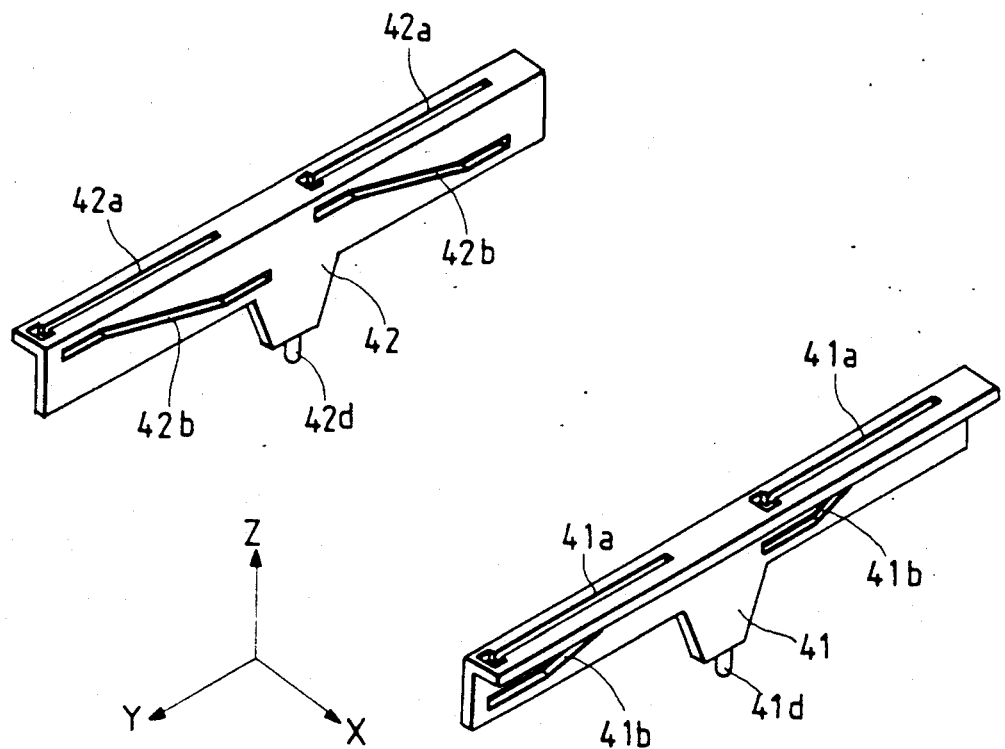
FIG. 24 is a perspective view of a pair of movable cams in the internal structure shown in FIG. 2.

FIG. 21 is an enlarged diagram of the chassis 6 shown in FIG. 2. As is apparent from FIGS. 2, 21, 4 and 22, the chassis 6, which is located below the movable base 25 supporting the above-described playing means, has a bottom 6b, and a pair of vertical walls 6c and 6d rising from the right and left ends of the bottom 6b. Longitudinal movable cams 41 and 42 are coupled to the two vertical walls 6c and 6d, respectively, in such a manner that they are movable forwardly and backwardly (in the direction of the arrow Y and in the opposite direction). As best shown in FIG. 24, the movable cams 41 and 42 have two guide grooves 41a and two guide grooves 42a in the upper end portions, respectively. The guide grooves 41a and 42a are engaged with T-shaped protrusions 6f (as shown in FIGS. 2, 4, 21 and 22) which are extended from the upper edges of the vertical walls 6c and 6d of the chassis 6, thus allowing the movable cams to freely move forwardly and backwardly.

As shown in FIGS. 2 and 4, four pins 25b are extended from the lower surface of the movable base 25; more specifically, two pins 25b are extended from each of the right and left ends of the lower surface of the movable base 25. These four pins 25b are slidably engaged with four guide grooves 6h, respectively, which are formed in the vertical walls 6c and 6d of the chassis 6 in such a manner that they are extended vertically. This engagement allows the chassis 6 to guide the movable base 25 vertically.

The pins 25b of the movable base 25 are further slidably engaged with the cam holes 41b and 42b formed in the movable cams 41 and 42. As best shown in FIG. 24, the cam holes 41b formed in the movable cam 41 on the left side are inclined downwardly (in the direction opposite to the direction of the arrow Z) as viewed in the forward direction (in the direction of the arrow Y); whereas the cam holes 42b formed in the movable cam 42 on the right side are inclined upwardly (in the direction of the arrow Z) as viewed in the same direction. Hence, as the movable cams 41 and 42 move relative to each other forwardly and backwardly, the movable base 25 is reciprocated vertically.

Figure 22:
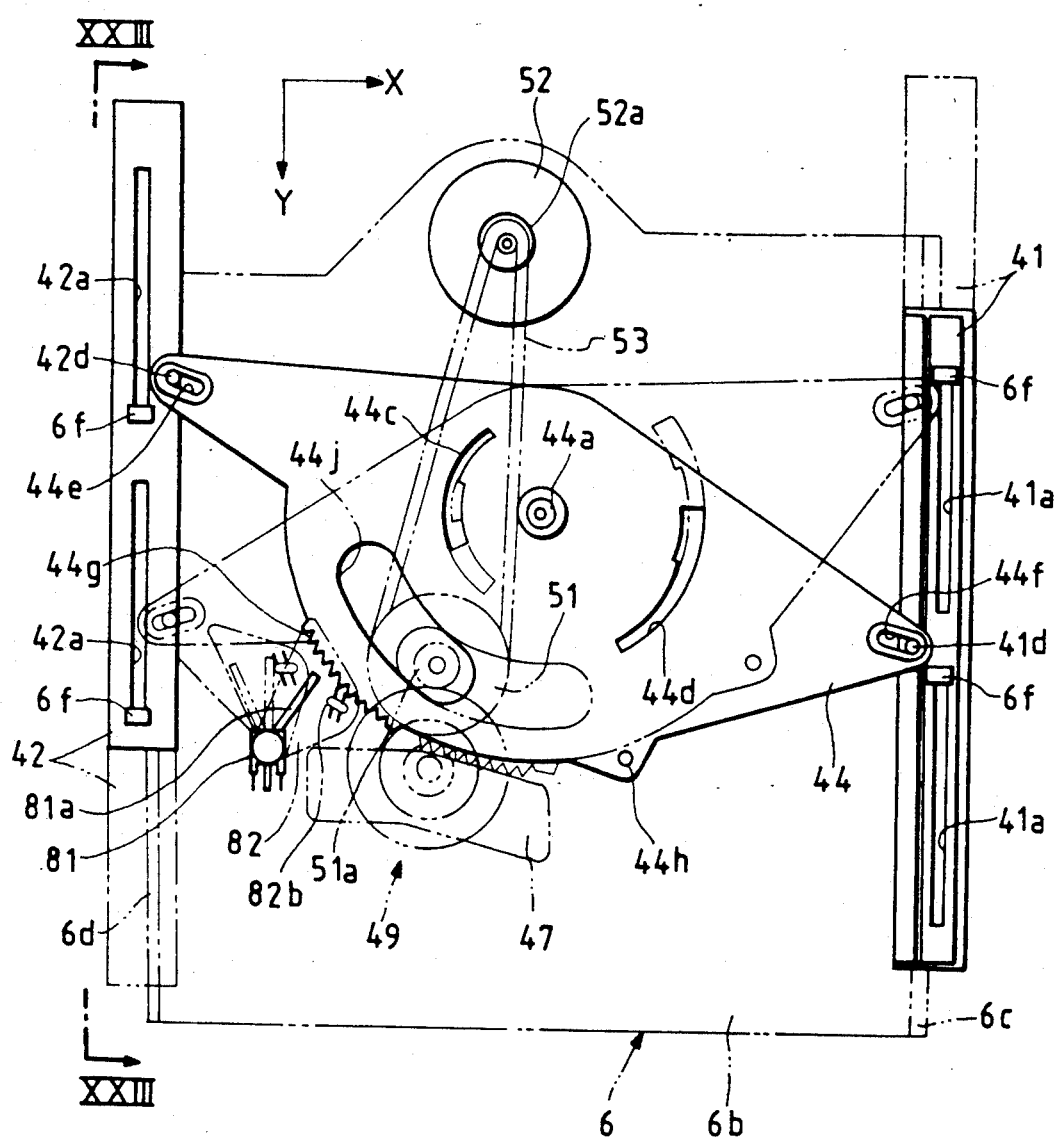
FIG. 22 is a view taken in the direction of the arrows substantially along line XXII—XXII in FIG. 4.
Figure 25:
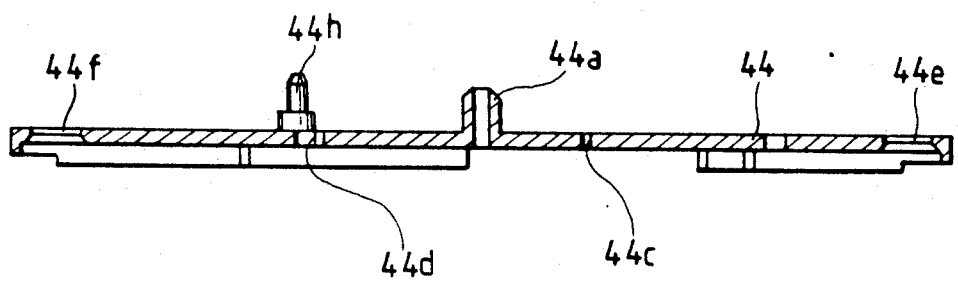
FIG. 25 is a vertical sectional view of a synchronizing lever in the internal structure shown in FIG. 2.
Figure 26:
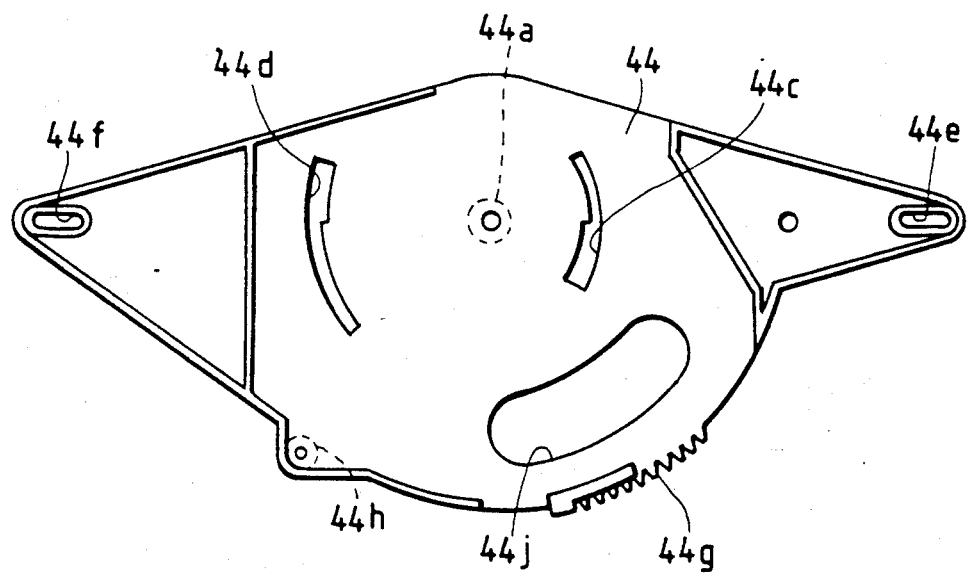
FIG. 26 is a bottom view of the synchronizing lever shown in FIG. 25.

As shown in FIGS. 2, 4 and 22, a synchronizing lever 44 is provided between the right and left movable cams 42 and 41 and below the chassis 6. A pin 44a is embedded in the synchronizing lever 44 substantially at the center, and engaged with a round hole 6j formed in the bottom 6b of the chassis 6; that is, the synchronizing lever 44 is swingably mounted on the chassis 6 through the pin 44a. The synchronizing lever 44 is shown in FIGS. 25 and 26 in more detail. As shown in FIGS. 2, 4 and 21, two pawls 6k are extended downwardly from the bottom 6b of the chassis 6 in such a manner that they are positioned on both sides of the round hole 6j. On the other hand, the synchronizing lever 44 has two guide grooves 44c and 44d on both sides of the pin 44a. The guide grooves 44c and 44d are slidably engaged with the aforementioned pawls 6k, thereby to guide the turning of the synchronizing lever 44. As shown in FIGS. 22, 25 and 26, elongated holes 44e and 44f are formed in two end portions of the synchronizing lever 44, respectively. The elongated holes 44e and 44f of the synchronizing lever 44 are engaged with pins 41d and 42d which are embedded in the lower end portions of the movable cams 41 and 42, respectively. More specifically, since the movable cams 41 and 42 are provided on one side of the bottom 6b of the chassis 6, and the synchronizing lever 44 is on the other side, the pins 41d and 42d of the movable cams 41 and 42 are inserted through elongated openings 6m (one of which is visible in FIGS. 2 and 21) formed in the bottom of the chassis 6 and into the elongated holes 44e and 44f of the synchronizing lever 44.

The right and left movable cams 42 and 41, being coupled through the synchronized lever 44 in the above-described manner, are reciprocated in synchronization with each other.

As shown in FIGS. 2 and 22, and FIGS. 25 and 26, an arcuate gear 44g is formed in a predetermined edge of a free end portion of the synchronizing lever 44, and a pin 44h is embedded in the upper surface of the synchronizing lever 44 at a predetermined position. The pin 44h is slidably engaged with a cam groove 5j formed in the lower surface of the tray 5 as shown in FIG. 8. The cam groove 5j is made up of a long straight portion 5k extended forwardly from the rear end of the tray 5, a short straight portion 5n extended forwardly toward the left from the front end of the long straight portion 5k, and a short straight portion 5m extended backwardly toward the left from the end of the short straight portion 5n. Since the tray 5 and the synchronizing lever 44 are provided on both sides of the bottom 6b of the chassis 6, respectively, the above-described pin 44h is inserted into the cam groove 5j through an arcuate opening 6n (shown in FIG. 21) formed in the bottom 6b of the chassis 6.

Figure 27:
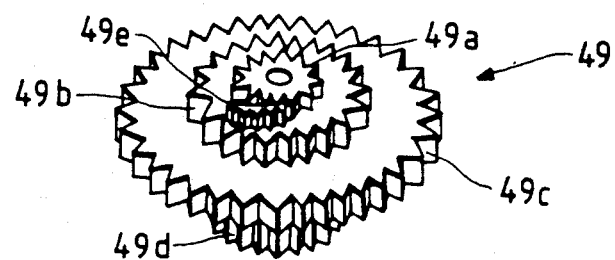
FIG. 27 is a perspective view of a compound gear in the internal structure shown in FIG. 2.

The arcuate gear 44g of the synchronizing lever 44 is engageable with a compound gear 49 which is rotatably supported on a receiving plate 47 (shown in FIGS. 2 and 22) which is coupled to the chassis 6 with screws or the like. The compound gear 49, as shown in FIG. 27, is made up of first through fourth circular gears 49a through 49d which are coaxially stacked one on another. The lowermost circular gear 49d is engaged with the arcuate gear 44g of the synchronizing lever 44.

Figure 23:
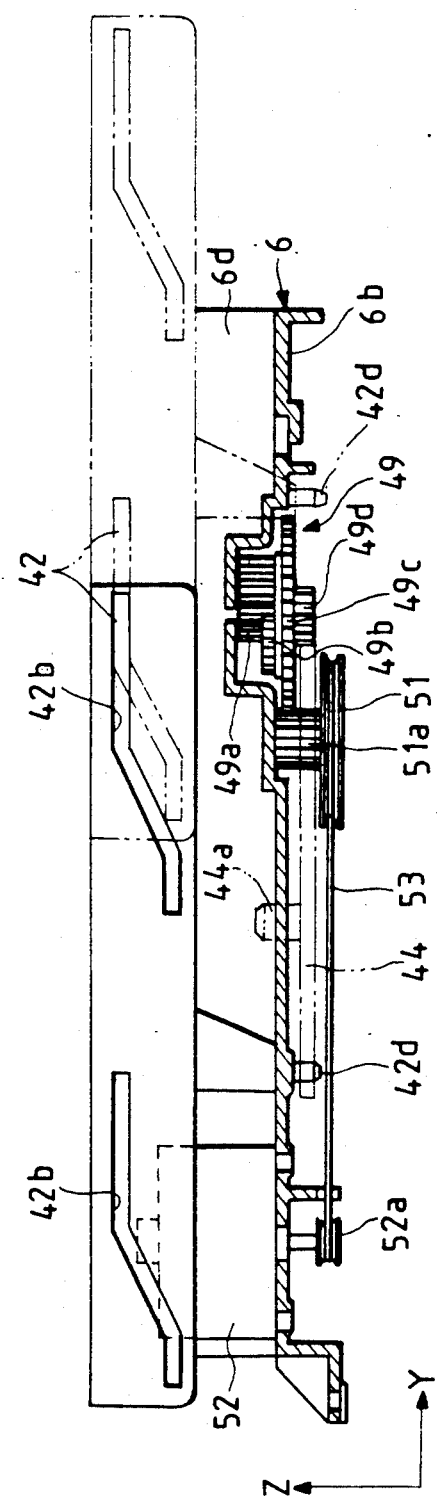
FIG. 23 is a view taken in the direction of the arrows substantially along line XXIII—XXIII in FIG. 22.

As shown in FIGS. 2, 22 and 23, a large pulley 51 is rotatably mounted in front of the compound gear 49 on the lower surface of the chassis 6. As shown in FIGS. 3 and 21, an electric motor 52 is mounted on the rear end portion of the chassis 6 in such a manner that its output shaft is extended downwardly. An endless belt 53 is laid over a small pulley 52a mounted on the output shaft of the motor 52 and the above-described pulley 51. A circular gear 51a is formed on the upper surface of the pulley 51 in such a manner that the gear 51a and the pulley 51 form one unit. The circular gear 51a is engaged with the third circular gear 49c (counting from the top down) of the compound gear 49. As shown in FIGS. 2, 22 and 26, the synchronizing lever 44 has an arcuate opening 44j, into which the circular gear 51a is inserted.

The motor 52, the pulley 51 including the circular gear 51a, the small pulley 52a, and the endless belt 53 form torque applying means for applying torque to the compound gear 49.

Figure 28:
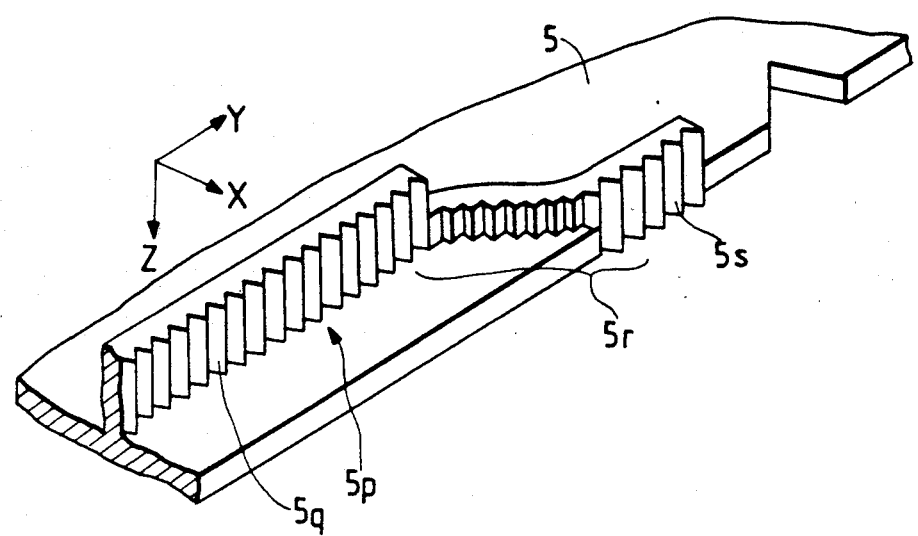
FIG. 28 is a perspective view of a rack formed in the tray shown in FIGS. 5 through 8 in such a manner as to engage with the compound gear shown in FIG. 27.

As was described above, the compound gear 49 is made up of the four circular gears 49a through 49d. The top or first circular gear 49a and the second circular gear 49b are engaged with a rack 5p which, as shown in FIGS. 4, 6, 7 and 8, is formed in the tray 5 in the direction of movement of the tray 5. FIG. 28 shows the rack as viewed with the rack's bottom up. As shown in FIGS. 28 and 8, the rack 5p of the tray 5 is made up of a long straight portion 5q which is extended forwardly from the rear end of the tray 5, a curved portion 5r extended from the end of the long straight portion 5q, and a short straight portion 5s extended from the end of the curved portion 5r in the same direction as the long straight portion 5q. The long straight portion 5q is engaged with the second, larger diameter circular gear 49b of the compound gear 49, and the short straight portion 5s is engaged with the top circular gear 49a which is smaller in diameter. The curved portion 5r between the straight portions 5q and 5s is engaged with an arcuate relay gear 49e which, as best shown in FIG. 27, is formed so as to couple the circular gears 49a and 49b to each other. The arrangement of the circular gears 49a and 49b, the arcuate relay gear 49e, and the rack 5p engaged therewith will be described in more detail later.

The compound gear 49, the rack 5p formed in the tray 5 for engaging with the compound gear 49, and the above-described torque applying means comprising the motor 52 to apply torque to the compound gear 49, form driving means for moving the tray back and forth. The driving means, and the chassis 6 which is a base body for guiding the tray 5, form a recording medium conveying device for conveying a recording medium, namely, a disk 3 to a playing position.

The compound gear 49, the above-described torque applying means comprising the motor 52 to apply torque to the compound gear 49, the movable cams 41 and 42, the synchronizing lever 44, the guide grooves 6h formed in the chassis 6 to guide the movable base 25 vertically, and their relevant components, form displacing means for moving the playing means including the depressing member 34 towards and away from the turntable 10 on the tray 5.

The installation of the above-described playing means and the above-described first vibration proofing means comprising three floatable rubber members 27 to support the playing means above the chassis in a floating mode will now be described.

As shown in FIGS. 2 and 3, the three floatable rubber members 27 are arranged in a plane perpendicular to the axis of rotation of the motor 33; i.e., the axis of rotation of the depressing member 34 in such a manner that they are substantially at the same distance from the axis of rotation. The center of gravity G (shown in FIG. 3) of the above-described playing means is on the axis of rotation. This construction prevents the depressing member from being vibrated along the axis of rotation, and accordingly the disk from being vibrated in the plane perpendicular thereto. Thus, the disk is played smoothly.

Now, the arrangement of the two circular gears 49a and 49b of the compound gear 49, the arcuate relay gear 49e provided to couple the circular gears 49a and 49b to each other, and the rack 5p of the tray 5 engaged with them will be described in more detail.

Figure 29:
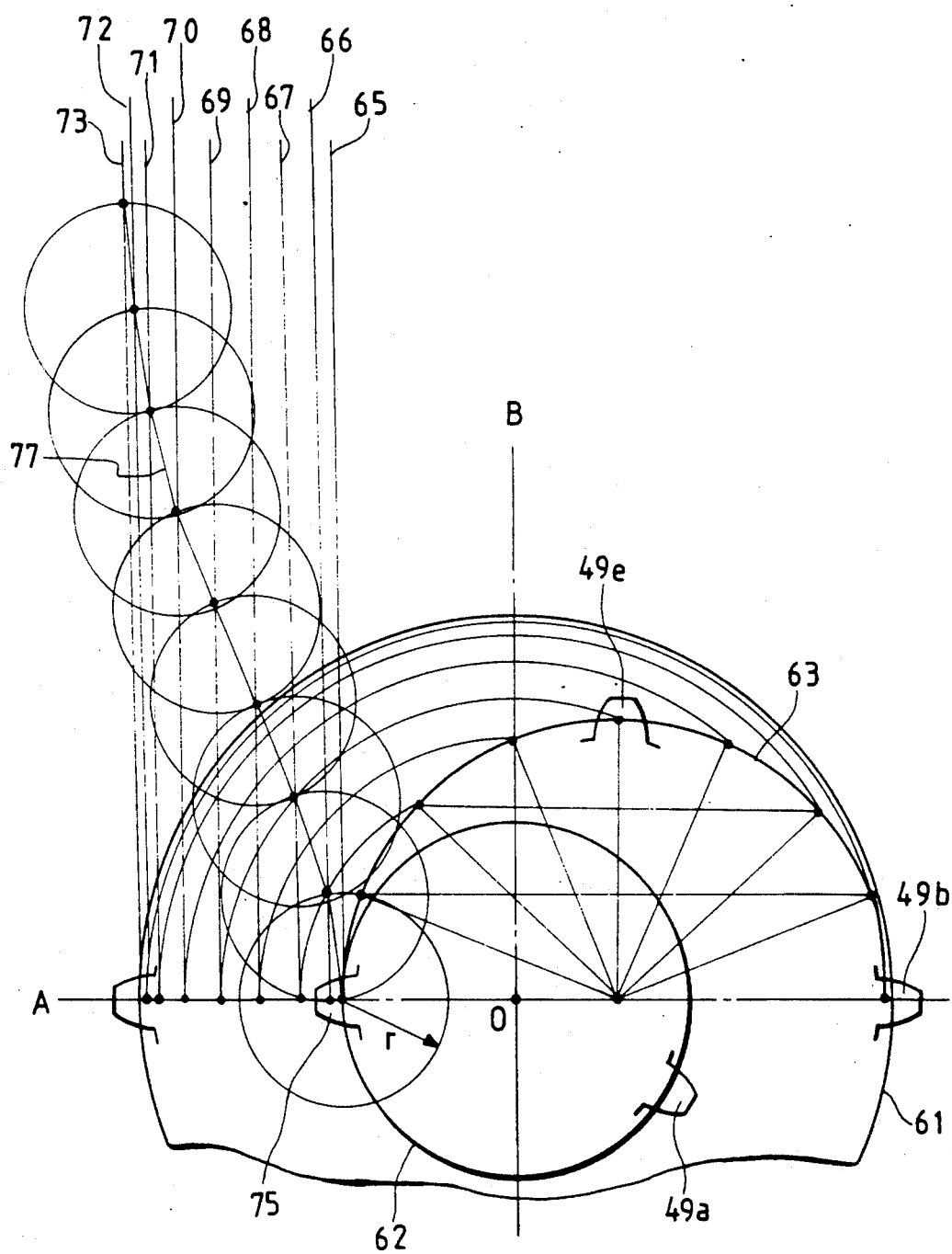
FIG. 29 is a diagram for a description of a construction which is made to obtain the pitch line of the arcuate relay gear of the compound gear shown in FIG. 27 and the curved portion of the rack shown in FIG. 28.

As shown in FIG. 29, as for the arcuate relay gear 49e of the compound gear 49, a circle 63 is drawn which internally touches the pitch circle 61 of the circular gear 49b of a large diameter and externally touches the pitch circle 62 of the circular gear 49a of a small diameter. The circle 63 thus drawn is employed as the pitch circle of the arcuate relay gear 49e.

On the other hand, the pitch line of the curved portion 5r of the rack 5p which is to be engaged with the arcuate relay gear 49e is determined by construction as follows:

First, as shown in FIG. 29, concentric circles are drawn which have a common center at the center of rotation of the circular gears 49a and 49b and pass through the pitch points of all the teeth of the arcuate relay gear 49e (the number of the circles thus drawn is equal to the number of teeth of the arcuate relay gear). Then, straight lines 65 through 73 are drawn which pass through the intersections of those circles and the axis A and are perpendicular to the axis A. Next, a circle is drawn which has a radius r and its center at the pitch point of the common gear 75 of the arcuate relay gear 49e and the circular gear 49a, and the intersection of the straight line 66 and the circle thus drawn is obtained. Another circle having the same radius r is drawn with the intersection thus obtained as its center, and the intersection of the straight line 67 and the circle thus drawn is obtained. Similarly, with respect to the remaining straight lines 68 through 73, circles having the same radius r are drawn, and the intersections of the straight lines 68 through 73 and the circles thus drawn are obtained. The intersections thus obtained are connected with a smooth curve. This smooth curve is the pitch line 77 of the curved portion 5r of the rack 5p.

Figure 30:
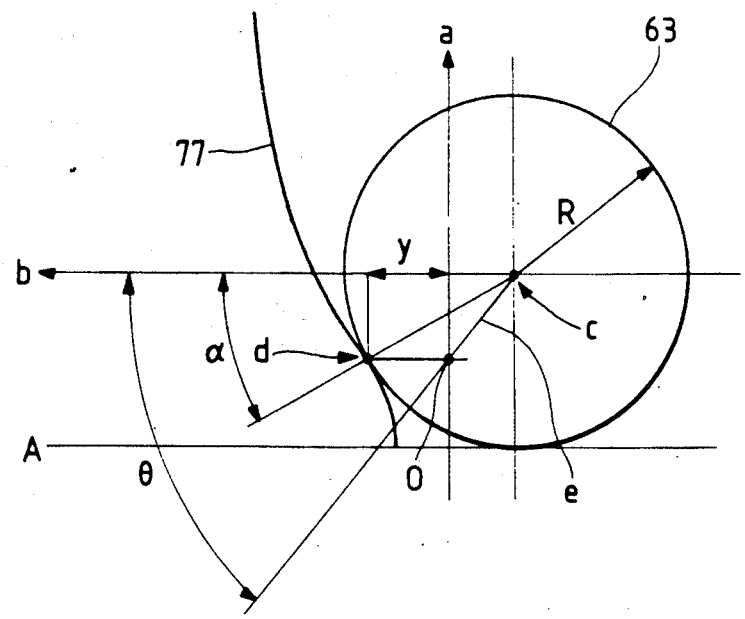
FIG. 30 is a diagram for a description of a method of obtaining through calculation the pitch line of the curved portion of the rack shown in FIG. 28.

The pitch line of the curved portion 5r of the rack 5p has been obtained by construction; however, it may be obtained by calculation as follows:

FIG. 30 shows the engagement of the arcuate relay gear 49e and the curved portion 5r. As shown in FIG. 30, the radius of the pitch circle of the arcuate relay gear 49e is R. The positional relationship between the center of the pitch circle of the arcuate relay gear 49e and the center of rotation O of the compound gear 49 is as shown in FIG. 30. In FIG. 30, a, b, c, d, e, $\alpha$ and $\theta$ are defined as follows:

a: the locus of the center of rotation of the compound gear 49;

b: the straight line which passes through the center of the arcuate relay gear 49e and is perpendicular to the line a;

c: the center of the arcuate relay gear 49e;

d: the contact point of the pitch circle 63 of the arcuate relay gear 49e and the curved portion 5r;

e: the distance between the center c and the center O of the compound gear 49;

$\theta$: the angle between the straight line b and the line connecting the center O and the center c; and $\alpha$: the angle between the straight line b and the line connecting the point d and the center c.

By substituting a variety of values of $\theta$ in the following simultaneous equations, the pitch line 77 of the curved portion 5r can be obtained.

$$e \sin \theta = R \sin \alpha$$

or $$\alpha = \sin^{-1} (e \sin \theta / R)$$

$$y = R \cos \alpha - e \cos \theta$$

Figure 31:
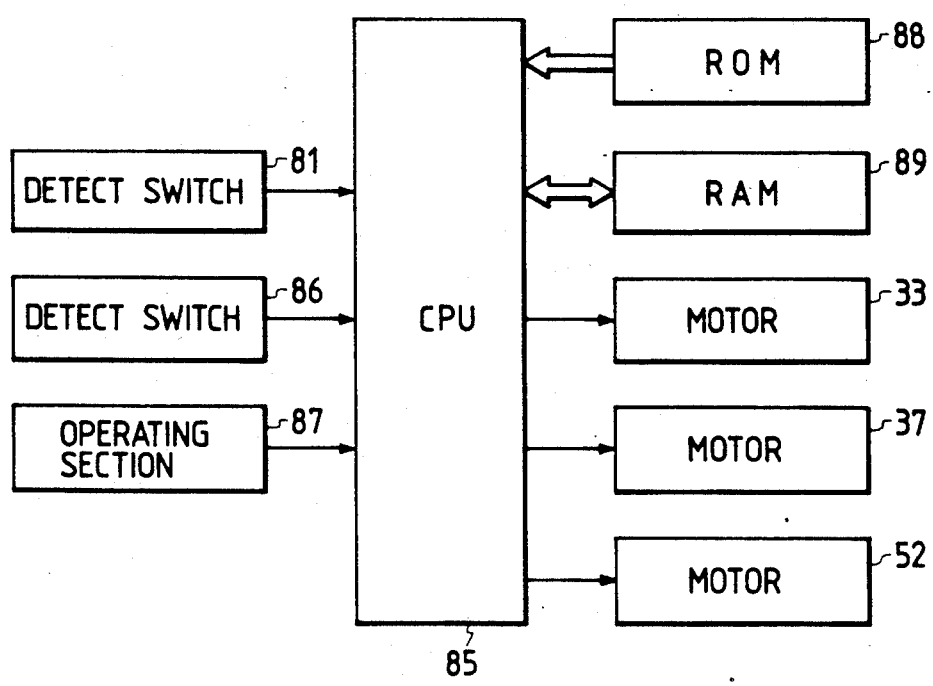
FIG. 31 is a block diagram showing an operation control system for the automatic loading disk player shown in FIGS. 1 through 30.

As shown in FIGS. 2, 21 and 22, a detecting switch 81 and an intermediate lever 82 are mounted in place on the lower surface of the chassis 6. The intermediate lever 82 is swingable about its pin 82a (shown in FIG. 21), and has a protrusion 82b at the free end. As the lever 82 swings, the protrusion 82b is engaged with the operating piece 81a of the detecting switch 81 to actuate the switch 81. More specifically, the swinging portion of the intermediate lever 82 is substantially triangular. As shown in FIG. 22, when the above-described synchronizing lever 44 engages with the swinging portion of the intermediate lever 82, the lever 82 is swung counterclockwise in FIG. 22 to actuate the detecting switch 81. The detecting switch 81 and the intermediate lever 82 are to detect that the tray has been pushed into the player housing 1 and the disk has been clamped. As shown in FIG. 31, a detection signal provided by the detecting switch 81 is applied to a control section. namely, a CPU 85 for controlling the operation of the disk player. As shown in FIG. 31, a detection signal outputted by a detecting switch 86 provided at a different position is also applied to the CPU 85. In response to the detection signals from the detecting switches and to signals from the switches in an operating section 87 (FIG. 31) on the front panel, the CPU 85 operates to drive the motors 33, 37 and 52 in cooperation with a RAM 89 according to the control program stored in a ROM 88.

Figure 32:
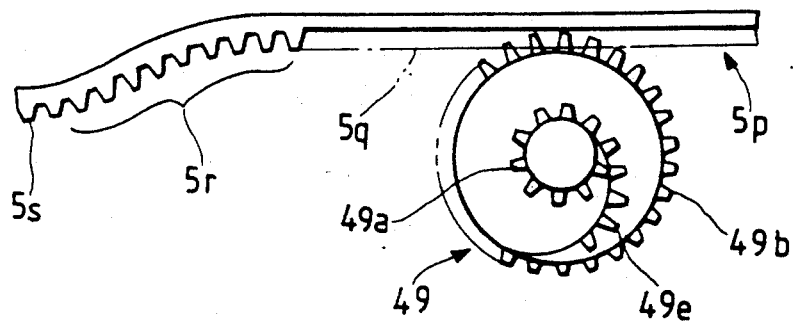
FIGS. 32, 33 and 34 are explanatory diagrams for a description of the operations of essential components in the automatic loading disk player shown in FIGS. 1 through 30.
Figure 33:
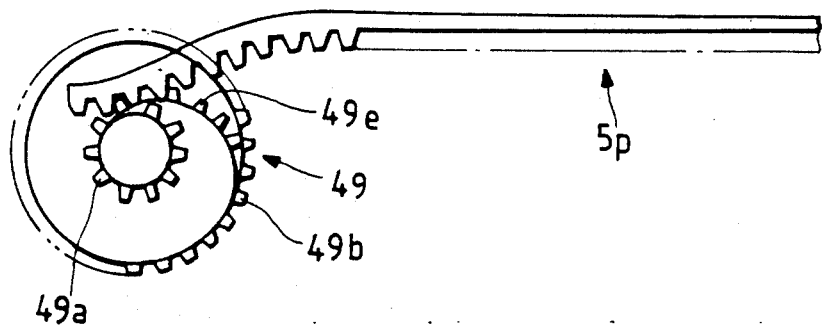
Figure 34:
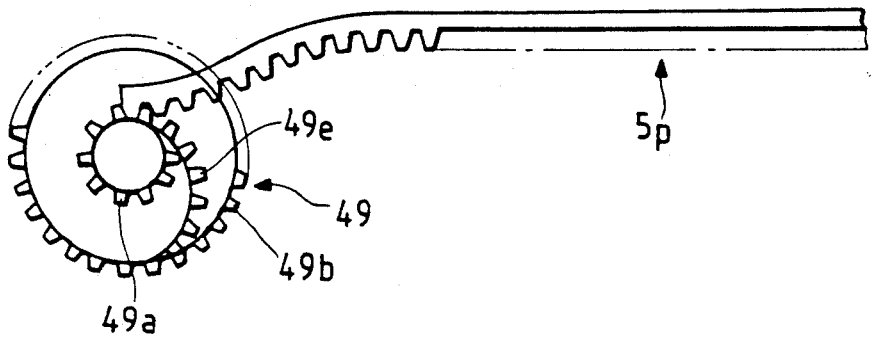
Figure 35:
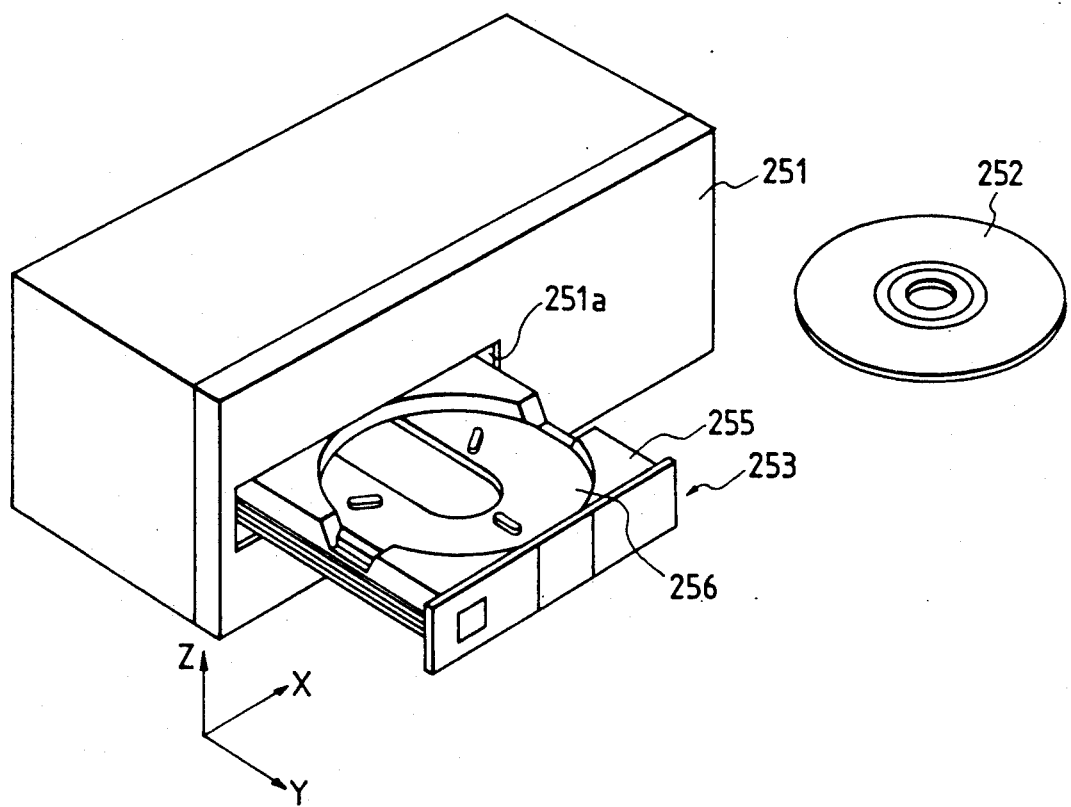
FIG. 35 is a perspective view showing a disk player equipped with a conventional recording medium conveying device.
Figure 36:
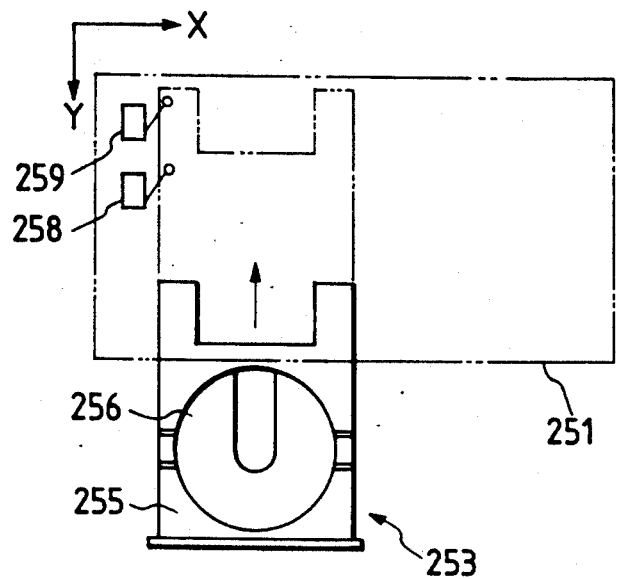
FIG. 36 is a plan view outlining essential components in the internal structure of the disk player shown in FIG. 35.
Figure 37:
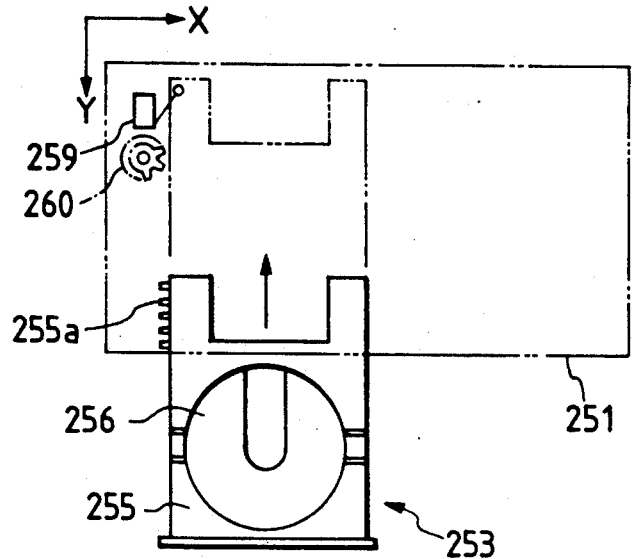
FIG. 37 is a plan view outlining one modification of the internal structure of the disk player shown in FIG. 35.

Now, the operation of the auto-loading disk player thus constructed will be described with reference to FIGS. 32 through 34. It is assumed that the tray 5 has been pulled out of the player housing 1 as shown in FIGS. 1 and 3.

After the tray 5 has been pulled out of the player housing 1 as shown in FIG. 1, a disk 3 to be played is placed on the turntable 10 on the tray 5. In this case, the turntable 10 is locked to the tray 5 because the lock plate 12 locks the table bearing 11 with the aid of the elastic force of the coil spring 22 as was described before. Hence, the turntable 10 will not be vibrated during the disk placing operation nor during a disk loading operation (described later).

After the disk 3 is placed on the turntable 10, the operating section 87 on the front panel is operated to issue a loading start instruction to start a disk loading operation.

In response to the loading start instruction, first the motor 52 is rotated in the forward direction, and accordingly, the compound gear 49 is rotated in the forward direction. As a result, the tray 5 having the rack 5p engaged with the compound gear 49 is moved backwardly (in the direction opposite to the direction of the arrow Y) into the player housing. That is, a tray accommodating operation is started. As shown in FIG. 32, for the period of time between a certain time instant in the tray accommodating operation and near the end of the same, the second circular gear 49b (FIG. 27) is engaged with the long straight portion 5q of the rack 5p, and therefore the tray 5 is moved relatively quickly. As the tray accommodating operation comes near the end, the compound gear 49 engages with the rack 5p as follows: That is, the arcuate relay gear 49e continued to the circular gear 49b, and the small-diameter circular gear 49a are engaged with the curved portion 5r and the short straight portion 5s of the rack 5p successively. Thus, the speed of movement of the tray 5 is reduced gradually and smoothly.

On the other hand, until the tray accommodating operation reaches its final stage, the cam groove 5j formed in the lower surface of the tray 5 is in sliding contact with the pin 44h of the synchronizing lever 44 through its long straight portion 5k. In the final stage of the tray accommodating operation, the short straight portion 5n obliquely extended from the long straight portion 5k is brought into sliding contact with the pin 44h. As a result, the synchronizing lever 44 is turned counterclockwise through a small angle, so that the arcuate gear 44g of the synchronizing lever 44 is engaged with the lowermost circular gear 49d of the compound gear 49 (FIG. 27). Being triggered by this engagement, the compound gear 49 rotating for the final stage of the tray accommodating operation turns the synchronizing lever 44 clockwise through a large angle in FIG. 22; that is, the synchronizing lever 44 is turned from the position indicated by the solid lines to the position indicated by the two-dot chain lines. Hence, as is seen from FIG. 22, the right and left movable cams 42 and 41 engaged with both ends of the synchronizing lever 44 are moved backwardly and forwardly, respectively. This relative movement of the two movable cams 41 and 42 lowers the movable base 25 which is in sliding contact with the cam holes 41b and 42b of the movable cams through the pins 25b.

The operation of accommodating the tray, and operation of lowering the movable base 25 are carried out as described above. When these operations come to an end, as shown in FIG. 22, the synchronizing lever 44 engages with the swinging portion of the intermediate lever 82, to swing it counterclockwise in FIG. 22. As a result, the protrusion 82b of the intermediate lever 82 engages with the operating piece 81a of the detecting switch 81, to activate the switch 81. As a result, the detecting switch 81 outputs the detection signal, which is applied to the CPU 85 (FIG. 31). In response to the detection signal, the CPU 85 operates to stop the motor 52. Thus, the disk 3 has been clamped by the turntable 10 and the depressing member 34.

When the synchronizing lever 44 swings as was described above, the pin 44h of the synchronizing lever is moved from the straight portion 5n of the cam groove 5j of the tray 5 to the portion 5m, so that the tray 5 is locked with respect to the player housing 1.

Thus, the disk can be played. In this state, the lock plate 12 has been disengaged from the table bearing 11 against the elastic force of the coil spring 22, and the table bearing and the turntable 10 are in a floating state being supported only by the coil spring 19. In the floating state, the clamp force W applied to the disk 3 is as follows:

$$W = W_M - \omega_1 = \omega_2 - (W_D + W_T)$$

where $W_M$: the weight of the mechanism (the playing means comprising the mechanical chassis 28, the bearing board 30, the motor 33 mounted on the bearing board, and the depressing member 34) supported by the floatable rubber members 27 (shown in FIG. 2 for instance);

$\omega_1$: the holding force of the three floatable rubber members 27;

$\omega_2$: the holding force of the coil spring 19;

$W_D$: the weight of the disk 3;

$W_T$: the weight of the turntable 10 and the table bearing 11.

When the disk is ready to be played as was described above, the motor 33 is rotated to turn the disk 3, while the motor 37 (shown in FIG. 3) is rotated to operate the optical pickup 36. Thus, the disk playing operation is carried out.

After the disk playing operation is ended, the disk 3 is moved out of the player housing 1. The detailed description of this disk returning operation will be omitted, because it is achieved by performing the above-described operations in the reverse order.

In the above-described embodiment, the compound gear 49 is mounted on the chassis 6 which is on the stationary side, and the rack 5p engaged with the compound gear 49 is formed on the tray 5 which is on the movable side. However, the device may be so modified that the rack is on the stationary side, and the compound gear 49 is on the movable side.

In the recording medium conveying device of the invention, the driving means for moving the movable recording medium bearing member adapted to bear a recording medium and convey it between the disk playing position and the disk loading and unloading position, comprises: the rack provided on one of the bearing member and the base body, which movably holds the bearing member, in such a manner that the rack is extended in a direction of movement of the bearing member; the gear unit provided on the other of the bearing member and the base body, and engaged with the rack; and the torque applying means for applying torque to the gear unit. The gear unit includes: a pair of circular gears which are different in diameter from each other and which are stacked coaxially as one unit; and the arcuate relay gear having the pitch circle which internally touches the pitch circle of one of the pair of circular gears which is larger in diameter and externally touches the other, and connects the pair of circular gears to each other. The rack has the straight portions engageable with the pair of circular gears, and the curved portion engageable with the arcuate relay gear.

In the recording medium conveying device according to the invention, the rack engages with the large diameter circular gear, the arcuate relay gear, and the small diameter circular gear of the gear unit successively, so that the speed of movement of the movable bearing member is reduced continuously; that is, it is reduced smoothly. In addition, when the bearing member has been accommodated in the player housing, the predetermined detecting switch outputs the detection signal, and in response to the detection signal thus outputted, the application of torque to the gear unit is suspended instantaneously. Thus, the bearing member can be stopped in position with high accuracy. In the recording medium conveying device, only one detecting switch is provided, and it is unnecessary to employ special components. Hence, the device can be manufactured at relatively low cost.

What is claimed is:

1. A recording medium conveying device for conveying a recording medium to a playing position through an inserting opening formed in a player housing, the recording medium conveying device comprising:

a base body provided in said player housing;

a movable recording medium bearing member for bearing said recording medium, said movable recording medium bearing member being provided on said base body so that said movable recording medium bearing member is movable between a protruding position outside said player housing and an accommodating position inside said player housing;

driving means for moving said movable recording medium bearing member, said driving means comprising:

a rack provided on one of said base body and said movable recording medium bearing member, so that said rack is extended in a direction of movement of said movable recording medium bearing member;

a gear unit provided on the other of said base body and said movable recording medium bearing member, and engaged with said rack; and torque applying means for applying torque to said gear unit, said gear unit including a pair of circular gears different in diameter from each other and which are stacked coaxially as a single unit; and an arcuate relay gear having a pitch circle which internally touches a pitch circle of one of said pair of circular gears having a larger diameter and externally touches the other of said pair of circular gears, and connecting said pair of circular gears to each other, said rack having straight portions engageable with said pair of circular gears, and a curved portion engageable with said arcuate relay gear.

2. The recording medium conveying device according to claim 1, wherein said recording medium comprises an optical data recording disk.

3. The recording medium conveying device according to claim 2, wherein said movable recording medium bearing member comprises a tray having a circular recess for accommodating a corresponding said optical data recording disk.

4. The recording medium conveying device according to claim 1, wherein said torque applying means comprises:

a motor having an output shaft and being mounted to said base body;

a small pulley mounted on the output shaft of said motor;

a large pulley rotatably mounted on said base body proximate to said gear unit;

a circular gear formed on an upper surface of said large pulley and being engaged with said gear unit; and an endless belt laid over said small pulley and said large pulley.

* * * * *